(12) United States Patent
Everest

(10) Patent No.: US 11,984,663 B2
(45) Date of Patent: May 14, 2024

(54) REMOTE ELECTRONIC TILT BASE STATION ANTENNAS AND MECHANICAL CALIBRATION FOR SUCH ANTENNAS

(71) Applicant: CommScope Technologies LLC, Hickory, NC (US)

(72) Inventor: Paul D. Everest, Flower Mound, TX (US)

(73) Assignee: CommScope Technologies LLC, Claremont, NC (US)

( * ) Notice: Subject to any disclaimer, the term of this patent is extended or adjusted under 35 U.S.C. 154(b) by 221 days.

(21) Appl. No.: 17/632,190

(22) PCT Filed: Sep. 3, 2020

(86) PCT No.: PCT/US2020/049096
§ 371 (c)(1),
(2) Date: Feb. 1, 2022

(87) PCT Pub. No.: WO2021/046149
PCT Pub. Date: Mar. 11, 2021

(65) Prior Publication Data
US 2022/0231413 A1   Jul. 21, 2022

Related U.S. Application Data

(60) Provisional application No. 62/896,677, filed on Sep. 6, 2019.

(51) Int. Cl.
*H01Q 3/32* (2006.01)
*F16H 19/04* (2006.01)
(Continued)

(52) U.S. Cl.
CPC .............. *H01Q 3/32* (2013.01); *F16H 19/04* (2013.01); *H01Q 1/246* (2013.01); *F16H 2025/2084* (2013.01); *F16H 2025/2093* (2013.01)

(58) Field of Classification Search
CPC . H01P 1/18; H01Q 1/24; H01Q 1/246; H01Q 3/32; H01Q 3/36; H01Q 3/00;
(Continued)

(56) References Cited

U.S. PATENT DOCUMENTS 6,567,051 B2 * 5/2003 Heinz .................... H01Q 21/08
343/757
7,907,096 B2   3/2011 Timofeev et al.
(Continued)

FOREIGN PATENT DOCUMENTS

WO   2007107051 A1   9/2007
WO   2009102774 A2   8/2009
WO   2019014964 A1   1/2019

OTHER PUBLICATIONS

"Communication with Supplementary European Search Report", EP Application No. 20861799.3, dated Aug. 23, 2023, 12 pp.
(Continued)

*Primary Examiner* — Tho G Phan
(74) *Attorney, Agent, or Firm* — Myers Bigel, P.A.

(57) ABSTRACT

The RET adjuster includes a drive assembly with a rotatable drive member operatively connected to a phase shifter assembly such that rotation of the drive member adjusts the phase shifter assembly. A first connector is coupled to the drive member where the first connector occupies a rest position when the drive member is at rest. A drive system has a second connector occupying a rest position when the drive system is at rest where the second connector is releasably engageable with the first connector such that actuation of the drive system rotates the drive member. A mechanical calibration system locates the second connector at the second rest position.

26 Claims, 18 Drawing Sheets

(51) Int. Cl.
   *H01P 1/18* (2006.01)
   *H01Q 1/24* (2006.01)
   *H01Q 3/36* (2006.01)
   *F16H 25/20* (2006.01)

(58) Field of Classification Search
   CPC . H01Q 3/005; F16H 19/04; F16H 2025/2084; F16H 2025/2093
   See application file for complete search history.

(56) References Cited

U.S. PATENT DOCUMENTS

| | | | |
|---|---|---|---|
| 9,306,278 B2* | 4/2016 | Lever | H01Q 3/04 |
| 9,722,309 B2 | 8/2017 | Berger et al. | |
| 10,615,488 B2* | 4/2020 | Liu | H01Q 1/246 |
| 10,854,967 B2* | 12/2020 | Zimmerman | H01Q 1/246 |
| 11,552,396 B2* | 1/2023 | Wang | H01Q 3/32 |
| 11,721,897 B2* | 8/2023 | Udagave | H01P 1/18 |
| | | | 342/368 |
| 2014/0043207 A1 | 2/2014 | Xie et al. | |
| 2016/0352011 A1 | 12/2016 | Duan | |
| 2017/0365923 A1 | 12/2017 | Schmutzler et al. | |
| 2017/0373379 A1 | 12/2017 | Schmutzler | |

OTHER PUBLICATIONS

"International Search Report and Written Opinion of the International Searching Authority", International Application No. PCT/US2020/049096, dated Dec. 18, 2020, 14 pp.

* cited by examiner

REMOTE ELECTRONIC TILT BASE STATION ANTENNAS AND MECHANICAL CALIBRATION FOR SUCH ANTENNAS

CROSS-REFERENCE TO RELATED APPLICATIONS

The present application is a 35 U.S.C. § 371 national stage application of PCT Application No. PCT/US2020/049096, filed on Sep. 3, 2020, which itself claims priority under 35 U.S.C. § 119 to U.S. Provisional Patent Application Ser. No. 62/896,677, filed Sep. 6, 2019, the entire contents of both of which are incorporated herein by reference as if set forth fully herein in their entireties.

FIELD OF THE INVENTION

The present invention relates to communication systems and, in particular, to base station antennas having remote electronic tilt capabilities.

BACKGROUND

Cellular communications systems are used to provide wireless communications to fixed and mobile subscribers. A cellular communications system may include a plurality of base stations that each provide wireless cellular service for a specified coverage area that is typically referred to as a "cell." Each base station may include one or more base station antennas that are used to transmit radio frequency ("RF") signals to, and receive RF signals from, the subscribers that are within the cell served by the base station. Base station antennas are directional devices that can concentrate the RF energy that is transmitted in or received from certain directions. The "gain" of a base station antenna in a given direction is a measure of the ability of the antenna to concentrate the RF energy in that direction. The "radiation pattern" of a base station antenna—which is also referred to as an "antenna beam"—is a compilation of the gain of the antenna across all different directions. Each antenna beam may be designed to service a pre-defined coverage area such as the cell or a portion thereof that is referred to as a "sector." Each antenna beam may be designed to have minimum gain levels throughout the pre-defined coverage area, and to have much lower gain levels outside of the coverage area to reduce interference between neighboring cells/sectors. Base station antennas typically comprise a linear array of radiating elements such as patch, dipole or crossed dipole radiating elements. Many base station antennas now include multiple linear arrays of radiating elements, each of which generates its own antenna beam.

Early base station antennas generated antenna beams having fixed shapes, meaning that once a base station antenna was installed, its antenna beam(s) could not be changed unless a technician physically reconfigured the antenna. Many modern base station antennas now have antenna beams that can be electronically reconfigured from a remote location. The most common way in which an antenna beam may be reconfigured electronically is to change the pointing direction of the antenna beam (i.e., the direction in which the antenna beam has the highest gain), which is referred to as electronically "steering" the antenna beam. An antenna beam may be steered horizontally in the azimuth plane and/or vertically in the elevation plane. An antenna beam can be electronically steered by transmitting control signals to the antenna that cause the antenna to alter the phases of the sub-components of the RF signals that are transmitted and received by the individual radiating elements of the linear array that generates the antenna beam. Most modern base station antennas are configured so that the elevation or "tilt" angle of the antenna beams generated by the antenna can be electronically altered. Such antennas are commonly referred to as remote electronic tilt ("RET") antennas.

In order to electronically change the down tilt angle of an antenna beam generated by a linear array of radiating elements, a phase taper may be applied across the radiating elements of the array. Such a phase taper may be applied by adjusting the settings on a phase shifter that is positioned along the RF transmission path between a radio and the individual radiating elements of the linear array. One widely-used type of phase shifter is an electromechanical "wiper" phase shifter that includes a main printed circuit board and a "wiper" printed circuit board that may be rotated above the main printed circuit board. Such wiper phase shifters typically divide an input RF signal that is received at the main printed circuit board into a plurality of sub-components, and then couple at least some of these sub-components to the wiper printed circuit board. The sub-components of the RF signal may be coupled from the wiper printed circuit board back to the main printed circuit board along a plurality of concentric arc-shaped traces, where each arc has a different diameter. Each end of each arc-shaped trace may be connected to a respective sub-group of radiating elements that includes at least one radiating element. By physically (mechanically) rotating the wiper printed circuit board above the main printed circuit board, the locations where the sub-components of the RF signal couple back to the main printed circuit board may be changed, which thus changes the lengths of the transmission paths from the phase shifter to the respective sub-groups of radiating elements. The changes in these path lengths result in changes in the phases of the respective sub-components of the RF signal, and since the arcs have different radii, the phase changes along the different paths will be different. Typically, the phase taper is applied by applying positive phase shifts of various magnitudes (e.g., +X°, +2X° and +3X°) to some of the sub-components of the RF signal and by applying negative phase shifts of the same magnitudes (e.g., −X°, −2X° and −3X°) to additional of the sub-components of the RF signal. Exemplary phase shifters of this variety are discussed in U.S. Pat. No. 7,907,096 to Timofeev, the disclosure of which is hereby incorporated herein in its entirety. The wiper printed circuit board is typically moved using an electromechanical actuator such as a DC motor that is connected to the wiper printed circuit board via a mechanical linkage. These actuators are often referred to as "RET actuators." Both individual RET actuators that drive a single mechanical linkage and "multi-RET actuators" that have a plurality of output members that drive a plurality or respective mechanical linkages are commonly used in base station antennas.

SUMMARY

Pursuant to embodiments of the present invention, a RET adjuster comprises a drive assembly including a rotatable drive member operatively connected to a phase shifter assembly such that rotation of the drive member adjusts the phase shifter assembly. A first connector is coupled to the drive member where the first connector occupies a first rest positon when the drive member is at rest. A drive system comprises a second connector occupying a second rest positon when the drive system is at rest. The second connector is releasably engageable with the first connector such that actuation of the drive system selectively rotates the drive member. A mechanical calibration system locates the second connector at the second rest position.

In some embodiments, the drive system may comprise a drive shaft connected to the second connector and a motor for rotating the drive shaft. The calibration system may comprise a stop member rotatable with the second connector. The calibration system may comprise a hard stop that is engageable by the stop member. When the stop member is engaged with the hard stop, the position of the second connector may be a known angular position relative to the second rest position. A base station control system may comprise a processor and a memory for storing the known angular position. The drive member may comprise a lead screw and a drive nut threadably engaged with the lead screw where the drive nut is operatively connected to the phase shifter assembly. A plurality of drive assemblies may be provided that are operatively connected to a plurality of phase shifter assemblies such that each drive assembly of the plurality of drive assemblies adjusts at least one phase shifter assembly of the plurality of phase shifter asemblies. The second connector may be engageable with the first connector by a linear movement of the drive system relative to the drive member. The first connector may comprise a coupling member mounted on the end of the drive member for reciprocating motion relative thereto where the coupling member rotates with the drive member. A spring may exert a force on the coupling member that tends to move the coupling member toward the second connector. The coupling member may comprise a plurality of first engagement structures arranged in spaced relationship about an axis of rotation of the coupling member. The plurality of first engagement structures may be equally spaced about the rotational axis of the coupling member. The coupling member may comprise a locking member that engages a stationary locking member to fix the drive member in position. The spring may move the locking member into engagement with the stationary locking member. The engagement of the first connector with the second connector may disengage the locking member from the stationary locking member. The first connector may comprise a plurality of first engagement structures arranged about an axis of rotation of the first connector. The plurality of first engagement structures may be equally spaced about the axis of rotation of the first connector. The second connector may comprise a plurality of second engagement structures that matingly engage the plurality of first engagement structures on the first connector. The plurality of second engagement structures may be arranged about an axis of rotation of the second connector. The plurality of second engagement structures may be equally spaced about the axis of rotation of the second connector. The drive system may be supported for reciprocating movement transverse to the plurality of drive assemblies such that the drive system may be aligned with any one of the plurality of drive assemblies. The drive system may comprise a drive shaft connected to the second connector and a motor for rotating the drive shaft wherein the drive shaft is supported in a bearing block. The drive shaft may have a first bevel gear on one end thereof remote from the second connector where the first bevel gear may engage a second bevel gear on an output shaft of the motor. The drive shaft may have a first section and a second section and the first section may be arranged for movement relative to the second section. The second bevel gear may be mounted for reciprocating movement on the output shaft such that the bevel gear may reciprocate along the the output shaft. A gear may rotate with the drive shaft where the gear selectively engages a fixed rack such that the actuation of the motor reciprocates the drive shaft transversely relative to the plurality of drive assemblies. A mode selection system may move the drive system between a drive mode, an index mode and a calibration mode. A mode selection system may move the drive system such that the first connector engages the second connector. A mode selection system may move the gear into engagement with the rack. A mode selection system may move the drive system between a first position where the stop member is positioned to engage the hard stop and a second position where the stop member is not positioned to engage the hard stop. The first connector may engage the second connector when the drive system is in the second position. A plurality of drive assemblies may be operatively connected to a plurality of phase shifter assemblies such that each drive assembly adjusts at least one phase shifter assembly of the plurality of phase shifter assemblies such that the mode selection system moves the drive system between a first position, a second position and a third position. In the first position, the stop member may engage the hard stop, in the second position the first connector may engage the second connector and in the third position the drive shaft may be supported for reciprocating movement transverse to the plurality of drive assemblies such that the drive system may be aligned with any one of the plurality of drive assemblies. The mode selection system may comprise a linearly reciprocating sled that supports the drive system. Movement of the sled may reciprocate the drive system between the first position, the second position and the third position. A rack may be fixed to the sled that is engaged by a pinion driven by a mode selection motor.

Pursuant to embodiments of the present invention, a multi-RET adjuster comprises a plurality of rotatable drive members where each of the plurality of rotatable drive members is operatively connected to an associated phase shifter assembly such that rotation of the drive member adjusts the associated phase shifter assembly. A first connector is coupled to each of the plurality of drive members where the first connector occupies a first rest positon when the drive member is at rest. A drive system comprises a second connector occupying a second rest positon when the drive system is at rest where the second connector is releasably engageable with the first connector such that actuation of the drive system selectively moves the drive member. A mechanical calibration system locates the second connector at the second rest position.

The drive system may comprise a rotatable drive shaft where the second connector is mounted on the drive shaft. A stop member may be mounted for rotation with the drive shaft. A stationary stop may be positioned such that the stop member contacts the stationary stop when the drive system is in a first position. A plurality of stationary stops may be positioned such that the stop member contacts one of the stationary stops when the drive system is in a first position. The drive shaft may be in the second rest position when the stop member contacts the stationary stop. A mode selection system may move the drive system between a first position, a second position and a third position. In the first position the stop member may engage the hard stop, in the second position the first connector may engage the second connector and in the third position the drive shaft may be supported for reciprocating movement transverse to the plurality of drive members such that the drive system may be aligned with any one of the plurality of drive members. The second rest position may be a known angular distance from the position of the drive system when the stop member contacts the stationary stop.

Pursuant to embodiments of the present invention, a method of calibrating a RET adjuster comprising: a movable drive member operatively connected to a phase shifter assembly such that movement of the drive member adjusts the phase shifter assembly; a first connector coupled to the drive member, the first connector occupying a first rest positon when the drive member is at rest; a drive system comprising a movable drive shaft and a stop member mounted for movement with the drive shaft, the drive shaft supporting a second connector, the second connector occupying a second rest positon when the drive system is at rest, and the second connector being releasably engageable with the first connector such that actuation of the drive system moves the drive member. The method comprises actuating the drive system to rotate the stop member into engagement with a stationary stop, the stationary stop positioned such that when the stop member contacts the stationary stop the second connector is in a known position; and using the known position to locate second connector at the second rest position.

The known position may be the second rest position. The known position may be a known angular distance from the second rest position. Actuating the drive system may rotate the drive shaft and the stop member. The second rest position may be stored in a memory of a base station control system.

Pursuant to embodiments of the present invention, a method of operating a multi-RET adjuster comprising a plurality of rotatable drive members wherein each of the plurality of rotatable drive members is operatively connected to an associated phase shifter assembly such that rotation of the drive member adjusts the associated phase shifter assembly; a first connector coupled to each of the plurality of drive members, the first connector occupying a first rest positon when the drive member is at rest; a drive system comprising a second connector occupying a second rest positon when the drive system is at rest, the second connector being releasably engageable with the first connector such that actuation of the drive system moves the drive member. The method comprises positioning the drive system adjacent to one of the plurality of rotatable drive members, the one of the plurality of rotatable drive members being operatively coupled to a phase shifter assembly to be adjusted; moving the drive system such that the second connector engages the first connector of the one of the plurality of rotatable drive members; and actuating the drive system to adjust the phase shifter assembly.

The step of positioning the drive system adjacent to one of the plurality of rotatable drive members may comprise actuating a first motor to move the drive assembly to an index mode position, and actuating a second motor to index the drive system transversely relative to the plurality of rotatable drive members. A rotating drive shaft may be connected to the second connector and a gear may be mounted on the drive shaft for rotation therewith. The gear may engage a rack when the drive system is in the index mode position. The step of moving the drive system may comprise actuating a first motor to move the drive assembly to a drive position. The step of actuating the drive system may comprise actuating a second motor to rotate a drive shaft that is connected to the second connector. The step of actuating the drive system may comprise rotating a lead screw to move a drive nut along the lead screw where the drive nut is operatively connected to the phase shifter.

DETAILED DESCRIPTION

Figure 1A:
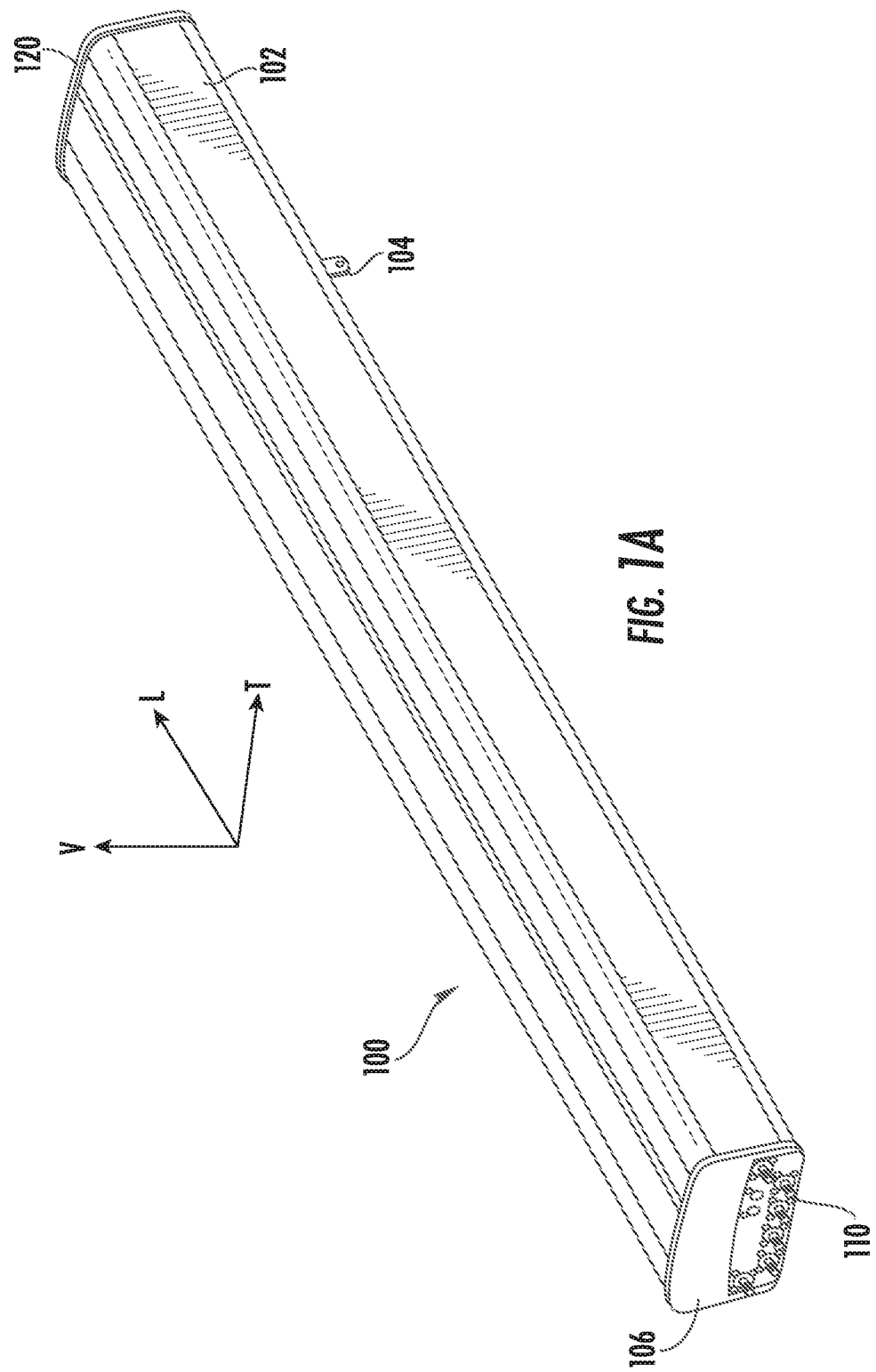
FIG. 1A is a perspective view of an example base station antenna according to embodiments of the present invention.

Modern base station antennas often include two, three or more linear arrays of radiating elements, where each linear array has an electronically adjustable down tilt. The linear arrays typically include cross-polarized radiating elements, and a separate phase shifter is provided for electronically adjusting the down tilt of the antenna beam for each polarization, so that the antenna may include, for example, twice as many phase shifters as linear arrays. Moreover, in many antennas, separate transmit and receive phase shifters are provided so that the transmit and receive radiation patterns may be independently adjusted. This again doubles the number of phase shifters. Thus, it is not uncommon for a base station antenna to have eight, twelve, sixteen or more phase shifters for applying remote electronic down tilts to the linear arrays. As described above, RET actuators are provided in the antenna that are used to adjust the phase shifters. While the same downtilt is typically applied to the phase shifters for the two different polarizations, allowing a single RET actuator and a single mechanical linkage to be used to adjust the phase shifters for both polarizations, modern base station antennas still often include four, six, eight or more RET actuators (or, alternatively, one or two multi-RET actuators) and associated mechanical linkages.

In order to change the downtilt angle of an antenna beam generated by a linear array on a base station antenna, a control signal may be transmitted from a base station control system to the antenna that causes a RET actuator associated with the linear array to generate a desired amount of movement in an output member thereof. The movement may comprise, for example, linear movement or rotational movement. A mechanical linkage is used to translate the movement of the output member of the RET actuator to movement of a moveable element of a phase shifter (e.g., a wiper arm) associated with the linear array. Accordingly, each mechanical linkage may extend between the output member of the RET actuator and the moveable element of the phase shifter.

Because the adjustment of the phase shifter requires precise movement of the wiper arm of the phase shifter, the accuracy of the RET actuator must be controlled in order to ensure that the downtilt angle of the antenna beam is correct. The repeated actuation of the RET actuator can result in inaccuracies being introduced into the system. Embodiments of the present invention provide a RET actuator and a mechanical calibration system for a RET actuator that provides for accurate adjustment of the phase shifter. Embodiments of the present invention also provide a low profile, scalable and mechanically reliable RET actuator.

Embodiments of the present invention will now be discussed in greater detail with reference to the drawings. In some cases, two-part reference numerals are used in the drawings. Herein, elements having such two-part reference numerals may be referred to individually by their full reference numeral (e.g., linear array 120-2) and may be referred to collectively by the first part of their reference numerals (e.g., the linear arrays 120).

Figure 1B:
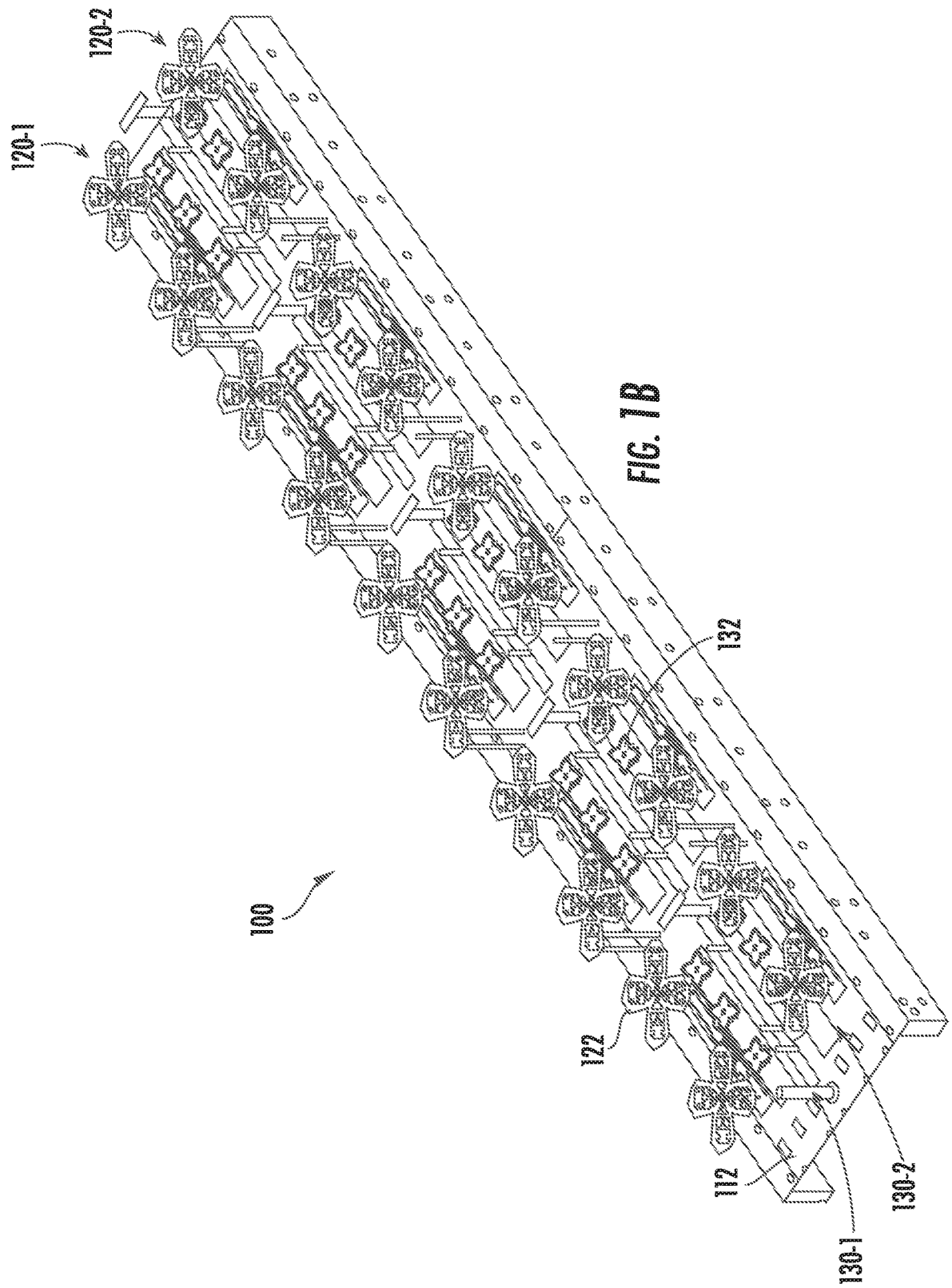
FIG. 1B is a perspective view of the base station antenna of FIG. 1A with the radome thereof removed.

FIG. 1A is a perspective view of a RET base station antenna 100 according to embodiments of the present invention. FIG. 1B is a perspective view of the base station antenna 100 with the radome removed to show the four linear arrays of radiating elements that are included in antenna 100.

As shown in FIG. 1A, the RET antenna 100 includes a radome 102, a mounting bracket 104, a bottom end cap 106 and a top end cap 120. A plurality of input/output ports 110 are mounted in the end cap 106. Coaxial cables (not shown) may be connected between the input/output ports 110 and the RF ports on one or more radios (not shown). These coaxial cables may carry RF signals between the radios and the base station antenna 100. The input/output ports 110 may also include control ports that carry control signals to and from the base station antenna 100 from a base station control system 250 (FIG. 5) that may be located remotely from base station antenna 100. These control signals may include control signals for electronically changing the tilt angle of the antenna beams generated by the base station antenna 100.

For ease of reference, FIG. 1A includes a coordinate system that defines the length (L), width (T) and depth (V) axes (or directions) of the base station antenna 100 that will be discussed throughout the application. The length axis may also be referred to as the longitudinal axis.

FIG. 1B is a perspective view of the base station antenna of FIG. 1A with the radome 102 removed. As shown in FIG. 1B, the base station antenna 100 includes two linear arrays 120-1, 120-2 of low-band radiating elements 122 (i.e., radiating elements that transmit and receive signals in a lower frequency band) and two linear arrays 130-1, 130-2 of high-band radiating elements 132 (i.e., radiating elements that transmit and receive signals in a higher frequency band). Each of the low-band radiating elements 122 is implemented as a cross-polarized radiating element that includes a first dipole that is oriented at an angle of −45° with respect to the azimuth plane (a horizontal plane) and a second dipole that is oriented at an angle of +45° with respect to the azimuth plane. Similarly, each of the high-band radiating elements 132 is implemented as a cross-polarized radiating element that includes a first dipole that is oriented at an angle of −45° with respect to the azimuth plane and a second dipole that is oriented at an angle of +45° with respect to the azimuth plane. Since cross-polarized radiating elements are provided, each linear array 120-1, 120-2, 130-1, 130-2 will generate two antenna beams, namely a first antenna beam generated by the −45° dipoles and a second antenna beam generated by the +45° dipoles. The radiating elements 122, 132 extend forwardly from a backplane 112 which may comprise, for example, a sheet of metal that serves as a ground plane for the radiating elements 122, 132.

Figure 2:
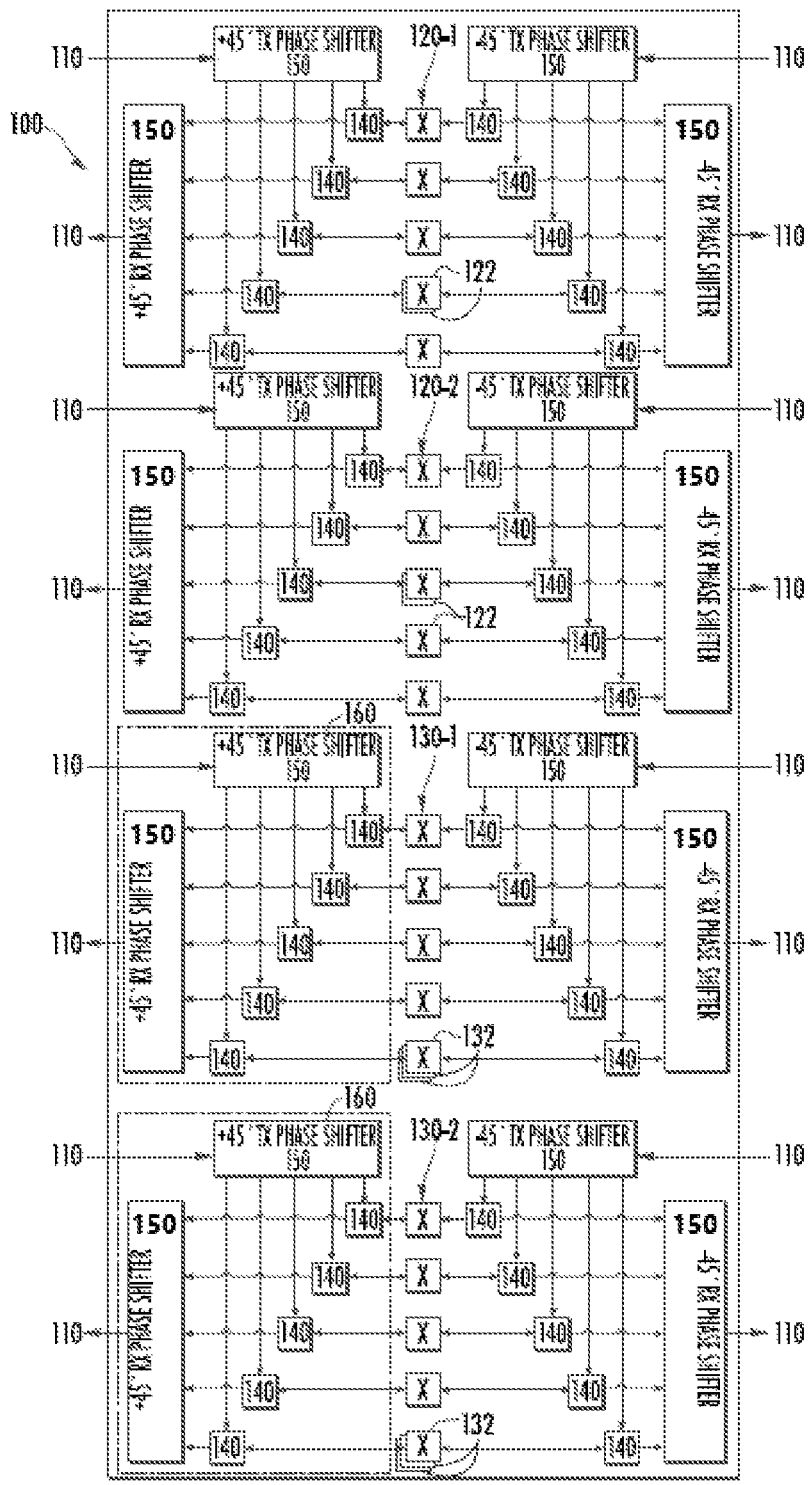
FIG. 2 is a schematic block diagram illustrating the electrical connections between various of the components of the base station antenna of FIGS. 1A-1B.

FIG. 2 is a schematic block diagram illustrating various additional components of the RET antenna 100 and the electrical connections therebetween. It should be noted that FIG. 2 does not show the actual location of the various elements on the antenna 100, but instead is drawn to merely show the electrical transmission paths between the various elements.

As shown in FIG. 2, each input/output port 110 may be connected to a phase shifter 150. The base station antenna 100 performs duplexing between the transmit and receive sub-bands for each linear array 120, 130 within the antenna (which allows different downtilts to be applied to the transmit and receive sub-bands), and hence each linear array 120, 130 includes both a transmit (input) port 110 and a receive (output) port 110. A first end of each transmit port 110 may be connected to the transmit port of a radio (not shown) such as a remote radio head. The other end of each transmit port 110 is coupled to a transmit phase shifter 150. Likewise, a first end of each receive port 110 may be connected to the receive port of a radio (not shown), and the other end of each receive port 110 is coupled to a receive phase shifter 150. Two transmit ports, two receive ports, two transmit phase shifters and to receive phase shifters are provided for each linear array 120, 130 to handle the two different polarizations.

Each transmit phase shifter 150 divides an RF signal input thereto into five sub-components, and applies a phase taper to these sub-components that sets the tilt (elevation) angle of the antenna beam generated by an associated linear array 120, 130 of radiating elements 122, 132. The five outputs of each transmit phase shifter 150 are coupled to five respective duplexers 140 that pass the sub-components of the RF signal output by the transmit phase shifter 150 to five respective sub-arrays of radiating elements 122, 132. In the example antenna 100 shown in FIGS. 1A, 1B and 2, each low-band linear array 120 includes ten low-band radiating elements 122 that are grouped as five sub-arrays of two radiating elements 122 each. Each high-band linear array 130 includes fifteen high-band radiating elements 132 that are grouped as five sub-arrays of three radiating elements 132 each.

Each sub-array of radiating elements passes received RF signals to a respective one of the duplexers 140, which in turn route those received RF signals to the respective inputs of an associated receive phase shifter 150. The receive phase shifter 150 applies a phase taper to each received RF signal input thereto that sets the tilt angle for the receive antenna beam and then combines the received RF signals into a composite RF signal. The output of each receive phase shifter 150 is coupled to a respective receive port 110.

While FIGS. 1B and 2 show an antenna having two linear arrays 120 of ten low-band radiating elements 122 each and two linear arrays 130 of fifteen high-band radiating elements 132 each, it will be appreciated that the number of linear arrays 120, 130 and the number of radiating elements 122, 132 included in each of the linear array 120, 130 may be varied. It will also be appreciated that duplexing may be done in the radios instead of in the antenna 100, that the number(s) of radiating elements 122, 132 per sub-array may be varied, that different types of radiating elements may be used (including single polarization radiating elements) and that numerous other changes may be made to the base station antenna 100 without departing from the scope of the present invention.

As can be seen from FIG. 2, the base station antenna 100 may include a total of sixteen phase shifters 150. While the two transmit phase shifters 150 for each linear array 120, 130 (i.e., one transmit phase shifter 150 for each polarization) may not need to be controlled independently (and the same is true with respect to the two receive phase shifters 150 for each linear array 120, 130), there still are eight sets of two phase shifters 150 that should be independently controllable. Accordingly, eight mechanical linkages may be required to connect the eight sets of phase shifters 150 to respective RET actuators.

Each phase shifter 150 shown in FIG. 2 may be implemented, for example, as a rotating wiper phase shifter. The phase shifts imparted by a phase shifter 150 to each sub-component of an RF signal may be controlled by a mechanical positioning system that physically changes the position of the rotating wiper of each phase shifter 150, as will be explained with reference to FIG. 3. It will be appreciated that other types of phase shifters may be used instead of rotating wiper phase shifters such as, for example, trombone phase shifters, sliding dielectric phase shifters and the like. For convenience, the movable element for the different types of phase shifters are referred to herein collectively as wiper printed circuit boards.

Figure 3:
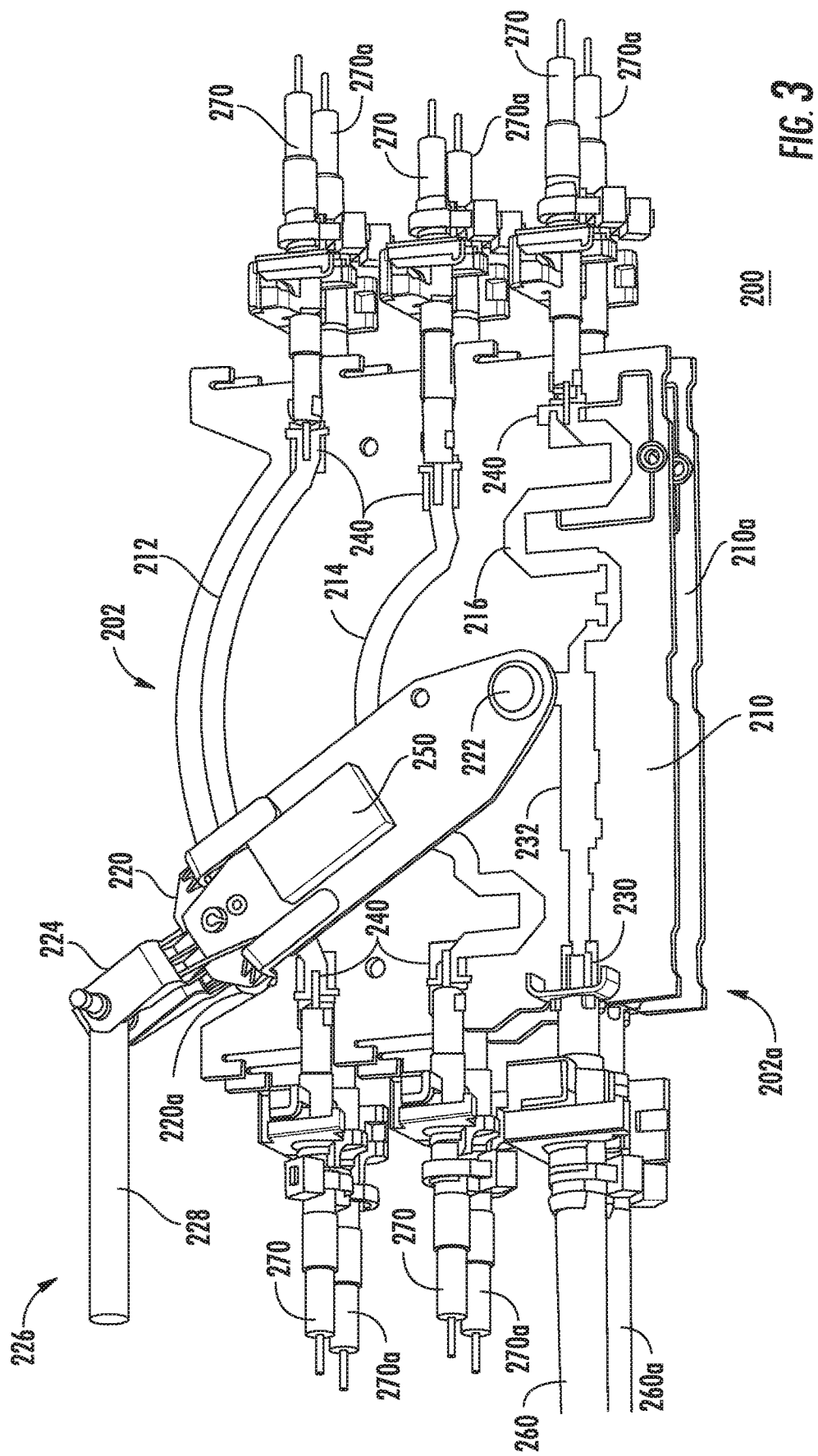
FIG. 3 is a front perspective view of a pair of electromechanical phase shifters that may be included in the base station antenna of FIGS. 1A-1B.

Referring to FIG. 3, a dual rotating wiper phase shifter assembly 200 is illustrated that may be used to implement, for example, two of the phase shifters 150 of FIG. 2. The dual rotating wiper phase shifter assembly 200 includes first and second phase shifters 202, 202*a*. In the description of FIG. 3 that follows it is assumed that the two phase shifters 202, 202*a* are each transmit phase shifters that have one input and five outputs. It will be appreciated that if the phase shifters 202, 202*a* are instead used as receive phase shifters then the terminology changes, because when used as receive phase shifters there are five inputs and a single output.

As shown in FIG. 3, the dual phase shifter 200 includes first and second main (stationary) printed circuit boards 210, 210*a* that are arranged back-to-back as well as first and second rotatable wiper printed circuit boards 220, 220*a* (wiper printed circuit board 220*a* is barely visible in the view of FIG. 3) that are rotatably mounted on the respective main printed circuit boards 210, 210*a*. The wiper printed circuit boards 220, 220*a* may be pivotally mounted on the respective main printed circuit boards 210, 210*a* via a pivot pin 222. The wiper printed circuit boards 220, 220*a* may be joined together at their distal ends via a bracket 224.

The position of each rotatable wiper printed circuit boards 220, 220*a* above its respective main printed circuit board 210, 210*a* is controlled by the position of a drive shaft 228 (partially shown in FIG. 3), the end of which may constitute one end of a mechanical linkage. The other end of the mechanical linkage (not shown) may be coupled to an output member of the RET actuator.

Each main printed circuit board 210, 210*a* includes transmission line traces 212, 214. The transmission line traces 212, 214 are generally arcuate. In some cases the arcuate transmission line traces 212, 214 may be disposed in a serpentine pattern to achieve a longer effective length. In the example illustrated in FIG. 3, there are two arcuate transmission line traces 212, 214 per main printed circuit board 210, 210*a* (the traces on printed circuit board 210*a* are not visible in FIG. 3), with the first arcuate transmission line trace 212 being disposed along an outer circumference of each printed circuit board 210, 210*a*, and the second arcuate transmission line trace 214 being disposed on a shorter radius concentrically within the outer transmission line trace 212. A third transmission line trace 216 on each main printed circuit board 210, 210*a* connects an input pad 230 on each main printed circuit board 210, 210*a* to an output pad 240 that is not subjected to an adjustable phase shift.

The main printed circuit board 210 includes one or more input traces 232 leading from the input pad 230 near an edge of the main printed circuit board 210 to the position where the pivot pin 222 is located. RF signals on the input trace 232 are coupled to a transmission line trace (not visible in FIG. 3) on the wiper printed circuit board 220, typically via a capacitive connection. The transmission line trace on the wiper printed circuit board 220 may split into two secondary transmission line traces (not shown). The RF signals are capacitively coupled from the secondary transmission line traces on the wiper printed circuit board 220 to the transmission line traces 212, 214 on the main printed circuit board. Each end of each transmission line trace 212, 214 may be coupled to a respective output pad 240. A coaxial cable 260 or other RF transmission line component may be connected to input pad 230. A respective coaxial cable 270 or other RF transmission line component may be connected to each respective output pad 240. As the wiper printed circuit board 220 moves, an electrical path length from the input pad 230 of phase shifter 202 to each output pad 240 changes. For example, as the wiper printed circuit board 220 pivots to the left, as viewed in FIG. 3, it shortens the electrical length of the path from the input pad 230 to the output pad 240 connected to the left side of transmission line trace 212 (which connects to a first sub-array of radiating elements), while the electrical length from the input pad 230 to the output pad 240 connected to the right side of transmission line trace 212 (which connects to a second sub-array of radiating elements) increases by a corresponding amount. These changes in path lengths result in phase shifts to the signals received at the output pads 240 connected to transmission line trace 212 relative to, for example, the output pad 240 connected to transmission line trace 216.

Figure 5:
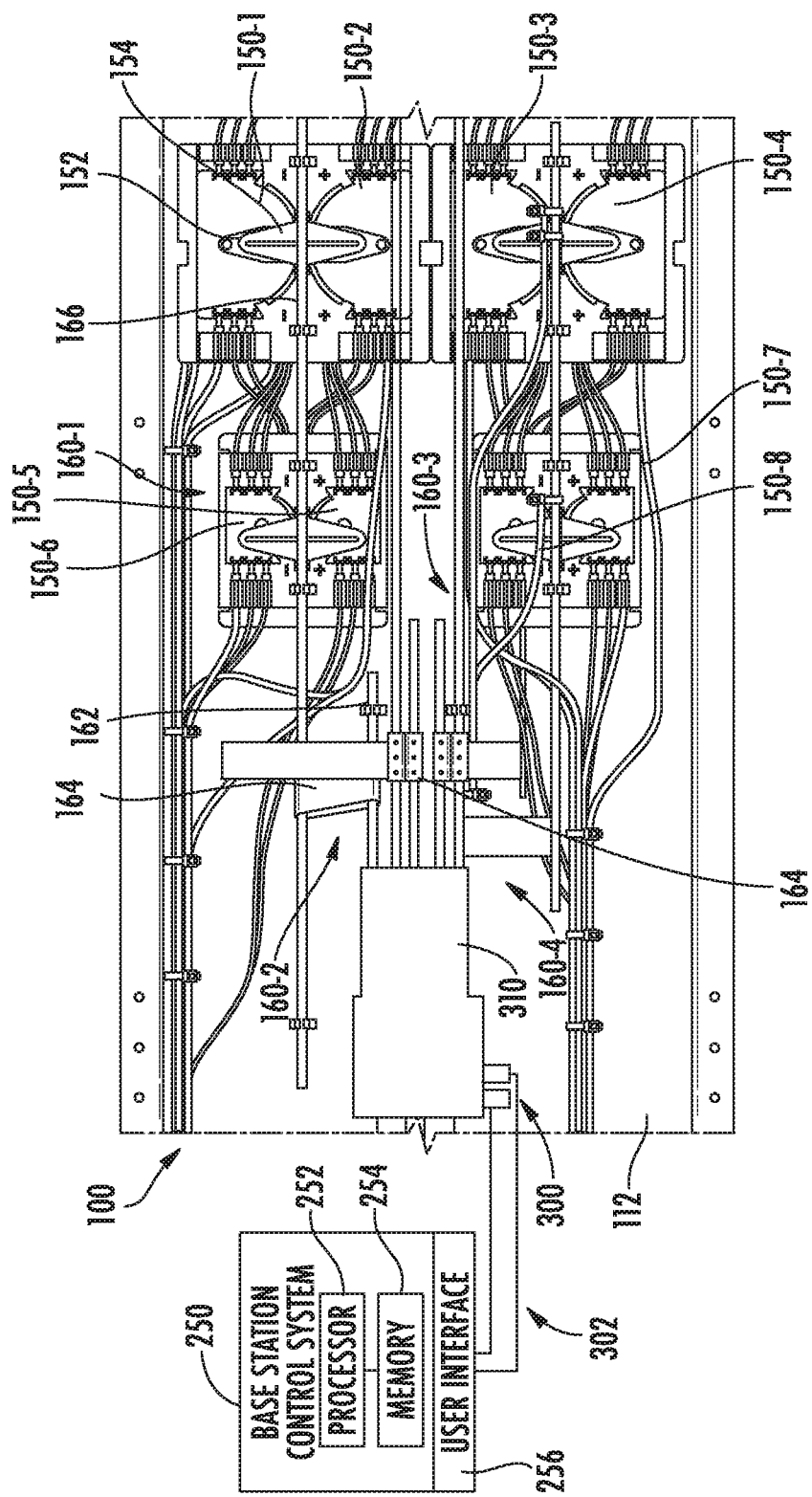
FIG. 5 is a rear view of a portion of the base station antenna of FIGS. 1A-1B that shows how mechanical linkages are used to connect the output members of the multi-RET actuator of FIG. 4 to respective ones of the phase shifters illustrated in FIGS. 2 and 3.

The second phase shifter 202*a* may be identical to the first phase shifter 202. As shown in FIG. 3, the rotating wiper printed circuit board 220*a* of phase shifter 202*a* may be controlled by the same drive shaft 228 as the rotating wiper printed circuit board 220 of phase shifter 202. FIG. 5 is a rear view of a portion of the base station antenna 100 that shows how mechanical linkages 160 are used to connect the output members of the RET actuator 300 to moveable elements of respective pairs of phase shifters 150. In FIG. 5, only a few of the elements have been given reference numerals to simplify the drawing (e.g., only one of the mechanical linkages and two of the phase shifters are given reference numerals).

As shown in FIG. 5, the multi-RET actuator 300 is mounted in the antenna 100 behind the backplane 112. Eight pairs of phase shifters 150 are also mounted rearwardly of the backplane 112 (only four pairs of phase shifters are visible in FIG. 5). Since the base station antenna 100 has linear arrays 120, 130 that are formed of dual-polarized radiating elements 122, 132, the phase shifters 150 are mounted in pairs since the phase shifter 150 for each polarization will be adjusted the same amount. In FIG. 5, phase shifters 150-1 and 150-2 are used to adjust the phase tapers applied to the first and second polarization radiators of the radiating elements 122 of linear array 120-1. It should be noted that the phase shifters a positioned in a side-by-side arrangement in FIG. 5 as opposed to the front-to-back arrangement as shown in FIG. 3.

As is further shown in FIG. 5, a plurality of mechanical linkages 160 are provided that connect each output member of the multi-RET actuator 300 to a respective pair of phase shifters 150. For example, mechanical linkage 160-1 is connected between one of the outputs of RET actuator 300 and a slider 154 of the phase shifter assembly that engages and rotationally moves the respective wiper arms 152 of phase shifters 150-1 and 150-2. As shown in FIG. 5, the mechanical linkage 160-1 includes a first RET rod 162 that is attached to the output of multi-RET actuator 300, a second RET rod 166, a first RET linkage 164 that connects the first RET rod 162 to the second RET rod 166, and the slider 154 that engages the wiper arms 152 of the phase shifters 150-1, 150-2. The other mechanical linkages 160 shown in FIG. 5 include similar combinations of RET rods 162, 166 and RET linkages 164. The RET rods 162, 166 typically extend in a longitudinal direction of the antenna 100, while the RET linkages 164 typically extend along the width and/or depth axes to connect RET rods 162, 166 together, and/or to connect a RET rod 162, 166 to an output member of the RET actuator or to a moveable element of a phase shifter assembly such as the slider 154 that engages the wiper arms 152. Each mechanical linkage 160 is used to transfer a linear movement of the outputs of the RET actuator 300 to a phase shifter assembly.

Figure 4:
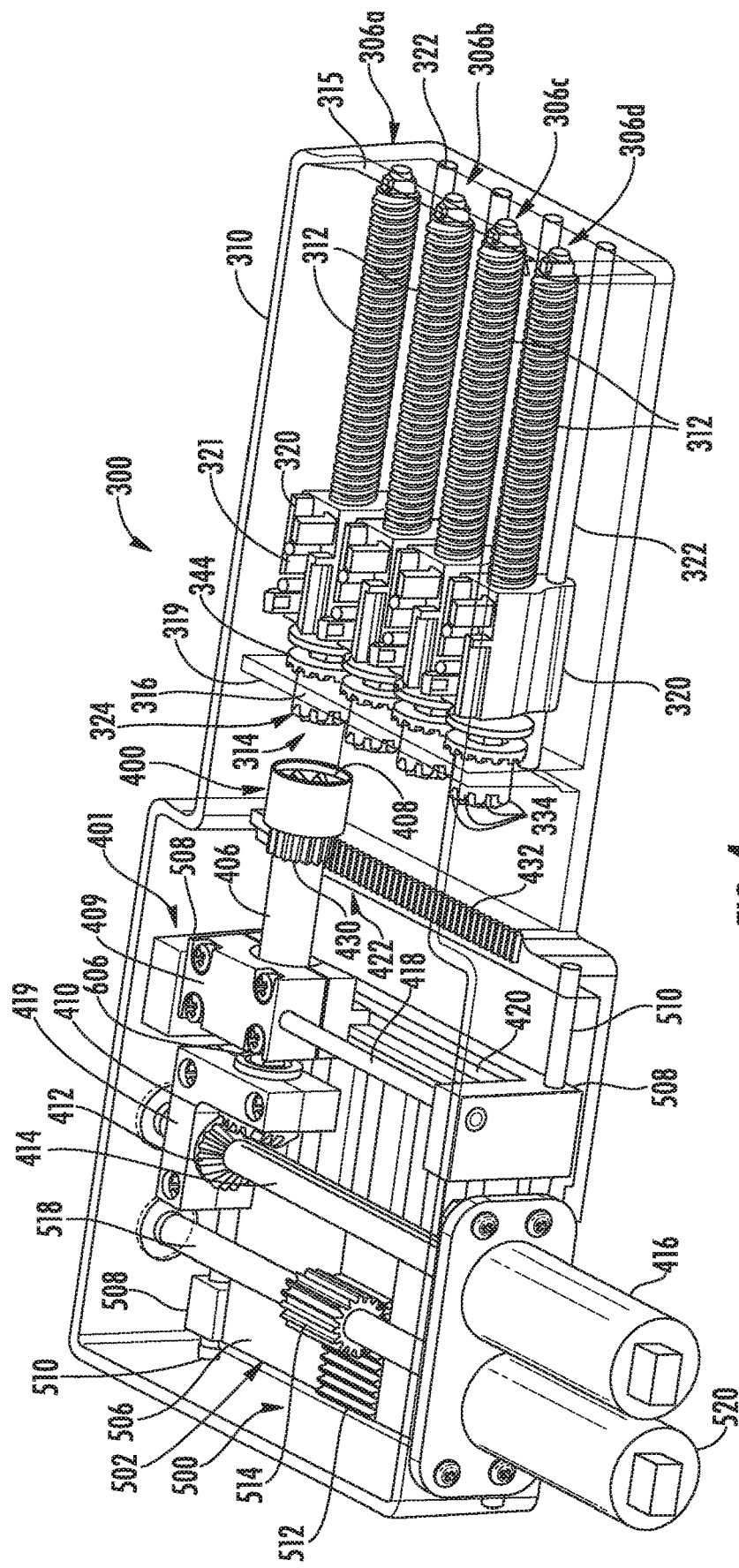
FIG. 4 is perspective view of an embodiment of the multi-RET actuator of the invention that may be included in the base station antenna of FIGS. 1A-1B.

Referring to FIGS. 4 through 15, the RET actuator 300 is used to drive the moveable element of the phase shifter 150 such as the wiper printed circuit board 220, 220a as described above. As shown in the figures, a housing 310 contains and supports the components of a multi-RET actuator where multiple outputs are provided that can drive multiple respective mechanical linkages 160. The housing 310 is shown in FIG. 4 as transparent and in FIGS. 6, 8, 9 and 10 the housing 310 is open to better illustrate the internal structure of the multi-RET actuator; however, in actual construction the housing 310 may be an enclosed, opaque housing and may be made of a suitable rigid material, such as plastic, metal or combinations of materials.

A base station control system 250 (FIG. 5) controls operation of the antenna 100 as is known in the art. The base station control system 250 also controls the multi-RET actuator 300 as will hereinafter be described. Communications cables 302 may be used to deliver control signals from the base station control system 250 to the multi-RET actuator 300 and from the multi-RET actuator 300 to the base station control system 250.

In some embodiments, the base station control system 250 may comprise a processor 252 communicably coupled to such devices as a memory 254 and a user interface 256. The processor 252 generally includes circuitry for implementing communication and/or logic functions of the antenna. The processor 252 may include functionality to operate one or more software programs, which may be stored in the memory 254. The base station control system 250 may be located remotely from the antenna 100, may be collocated with the antenna 100 or various functions of the base station control system 250 may be allocated between the antenna and a remote location.

As used herein, a "processor" refers to a device or combination of devices having circuitry used for implementing the communication and/or logic functions of the system. For example, the processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in memory 254. As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory" generally refers to a device or combination of devices that store one or more forms of computer-readable media for storing data and/or computer-executable program code/instructions. For example, in one embodiment, the memory 254 as described herein includes any computer memory that provides an actual or virtual space to temporarily or permanently store data and/or commands provided to the processor 252 when the processor carries out its functions described herein. As used herein, "memory" includes any computer readable medium configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like.

The user interface 256 may be made up of user output devices and/or user input devices, which are operatively coupled to the processor 210. The user output devices may include a visual display, audio device and/or the like. The user input devices may include any of a number of devices allowing the base station control system 250 to receive data, such as a keypad, keyboard, touch-screen, touchpad, microphone, mouse, joystick, other pointer device, button, soft key, and/or other input device(s).

Referring again to FIGS. 4 through 15, a multi-RET actuator 300 having four drive assemblies 306a-306d is shown. The four drive assemblies 306a-306d may move four or more mechanical linkages where each drive assembly 306a-306d is operatively connected to at least one phase shifter assembly by a mechanical linkage. While four drive assemblies 306a-306d are shown, the multi-RET actuator 300 is scalable such that the multi-RET actuator 300 may include a greater or fewer number of drive assemblies 306 to drive a greater or fewer number of mechanical linkages. Drive assemblies 306a-306d each comprise a drive mechanism for converting a rotational input into a linear output. In one embodiment, the drive assemblies 306a-306d comprise a rotary drive member that is operatively connected to a linear output. The linear output is operatively coupled to the wiper printed circuit board 220, 220a of the phase shifter assembly 200 by the mechanical linkage such that movement of the linear output adjusts the phase shifter assembly. The drive assemblies 306a-306d are identical such that a single drive assembly 306a will be described in detail. In one embodiment, the drive member comprises a lead screw 312 that is rotatably supported in the housing 310 such that lead screw 312 is rotatable along its longitudinal axis. The drive member may also comprise a belt drive, chain drive, ball drive, gear train, linkage, or the like, or combinations of such devices.

The distal end of lead screw 312 may be supported in a suitable bearing 313 in a first wall 315 of the housing 310. The proximal end of lead screw 312 includes a screw connector 314 that is mounted to the lead screw 312 for rotation therewith. Screw connector 314 comprises a coupling member 324 that includes a nub 316 that is rotationally supported in and extends through an aperture 318 in wall 319 of housing 310. The lead screws 312 of the drive assemblies 306a-306d are disposed parallel to one another.

A linear output is provided for transmitting the rotation of the drive members to the mechanical linkage. In one embodiment, the linear output comprises a drive nut 320 that threadably engages the lead screw 312 such that rotation of the lead screw 312 causes the drive nut 320 to reciprocate along the length of the lead screw 312. The drive nut 320 includes a clip structure 321 for connecting the drive nut to the mechanical linkage. The clip structure 321 may comprise any suitable connection mechanism. A stationary rod 322 is supported in the housing 310 that extends parallel to the lead screw 312. The rod 322 may extend through a bearing sleeve 323 in the drive nut 320 to prevent rotation of the drive nut 320 and to guide the drive nut 320 in a linear path of travel along the length of the lead screw 312. The direction of rotation of the lead screw 312 may be reversed to change the direction of travel of the drive nut 320 along the lead screw. The mechanical linkage that connects to the wiper printed circuit board 220, 220a of the phase shifter assembly 200 is connected to the drive nut 320 such that the reciprocating movement of the drive nut 320 causes the adjustment of the phase shifter assembly as previously described.

The screw connector 314 releasably connects the lead screw 312 to the drive connector 400 of the drive system 401. The screw connector 314 is configured such that the drive connector 400 may be selectively connected to, and released from, the screw connector 314 by a linear movement of the drive connector 400 relative to the screw connector 314 along the rotational axis of the lead screw 312. The screw connector 314 also functions to lock the drive assemblies 306a-306d in position during use of the multi-RET actuator, as will be described.

The coupling member 324 of screw connector 314 is mounted on the end of the lead screw 312 for reciprocating motion relative thereto along the longitudinal axis of the lead screw 312. In the illustrated embodiment, the coupling member 324 has a cup-shaped configuration where the interior recess 326 fits over the end of the lead screw 312 such that the coupling member 324 can reciprocate relative to the lead screw 312 but is prevented from rotating relative to the lead screw. In the illustrated embodiment, the proximal end of the lead screw 312 and the recess 326 of the coupling member 324 are provided with a series of flat faces, such as a hex-style connector, that allows reciprocating motion between the coupling member 324 and the lead screw 312 but that prevents relative rotational movement therebetween. While mating flat faces are used in the illustrated embodiment to connect the coupling member 324 to the end of the lead screw 312, other mechanisms may be used such as a keyed connection, pin and slot arrangement or the like. A spring 328 exerts a force on the coupling member 324 that tends to move the coupling member 324 away from the lead screw 312 toward the drive connector 400. The spring 328 may comprise a compression spring that is located in a longitudinally extending recess 330 formed in the end of the lead screw 312.

The nub 316 of the coupling member 324 faces the drive connector 400. The nub 332 includes a series of engagement structures 334 that are arranged in spaced relationship about the rotational axis of the nub 316. The engagement structures 334 may comprise a series of external teeth, flat surfaces, splines, a star receptacle or the like that matingly and releasably engage with corresponding engagement structures formed on the drive connector 400 and that transfer rotary movement of the drive connector 400 to the lead screw 312. While specific engagement structures comprising a plurality of teeth are shown and described herein, any suitable engagement structures that provide a releasable rotating connector to the drive connector 400 may be used provided that the engagement structures allow for angular positioning of the lead screw 312 relative to the drive system 401, as will hereinafter be described. In this regard, the engagement structures 334 comprise a plurality of discrete elements arranged in known angular positions around the rotational axis of the lead screw. For example, a series of equally spaced teeth may be used as shown in the figures.

The coupling member 324 also includes an outwardly projecting flange or lip 344. The flange 344 includes a series of spaced locking members 346 (FIG. 6) arranged in an annular configuration about the longitudinal axis of the coupling member 324 that face the wall 319. The wall 319 includes a series of stationary locking members 350 that extend from the wall 319 and face the locking members 346 on the flange 344. The locking members 350 and the locking members 346 interengage with one another to fix the lead screw 312 in position when the lead screw is not being adjusted and is in the rest position. The locking members 346 and 350 may be formed as a series of projecting teeth and, in one embodiment, are formed as a series of generally triangular shaped teeth that allow the locking members to engage with one another even if slightly out of alignment. While the locking members 346 and 350 may be formed as a series of teeth, the locking members may be configured other than as teeth, such as roughened friction surfaces, ridges, pins and apertures, or the like, provided the interengagement of the locking members 346 and 350 locks the lead screw 312 in position.

Absent a counteracting force, the spring 328 extends the coupling member 324 away from the lead screw 312 such that the locking members 346 on the flange 344 engage the locking members 350 on the wall 319. The engagement of locking members 346 with the locking members 350 prevents the coupling member 324 from rotating. The keyed engagement of the coupling member 324 with the lead screw 312 prevents the lead screw 312 from rotating relative to the coupling member 324. Thus, the engagement of the locking members 346 and the locking members 350 prevents the lead screw 312 from rotating to thereby lock the drive nut 320 in positon and fix the position of the mechanical linkage and the corresponding wiper printed circuit board 220, 220a of the phase shifter assembly 220.

Figure 6:
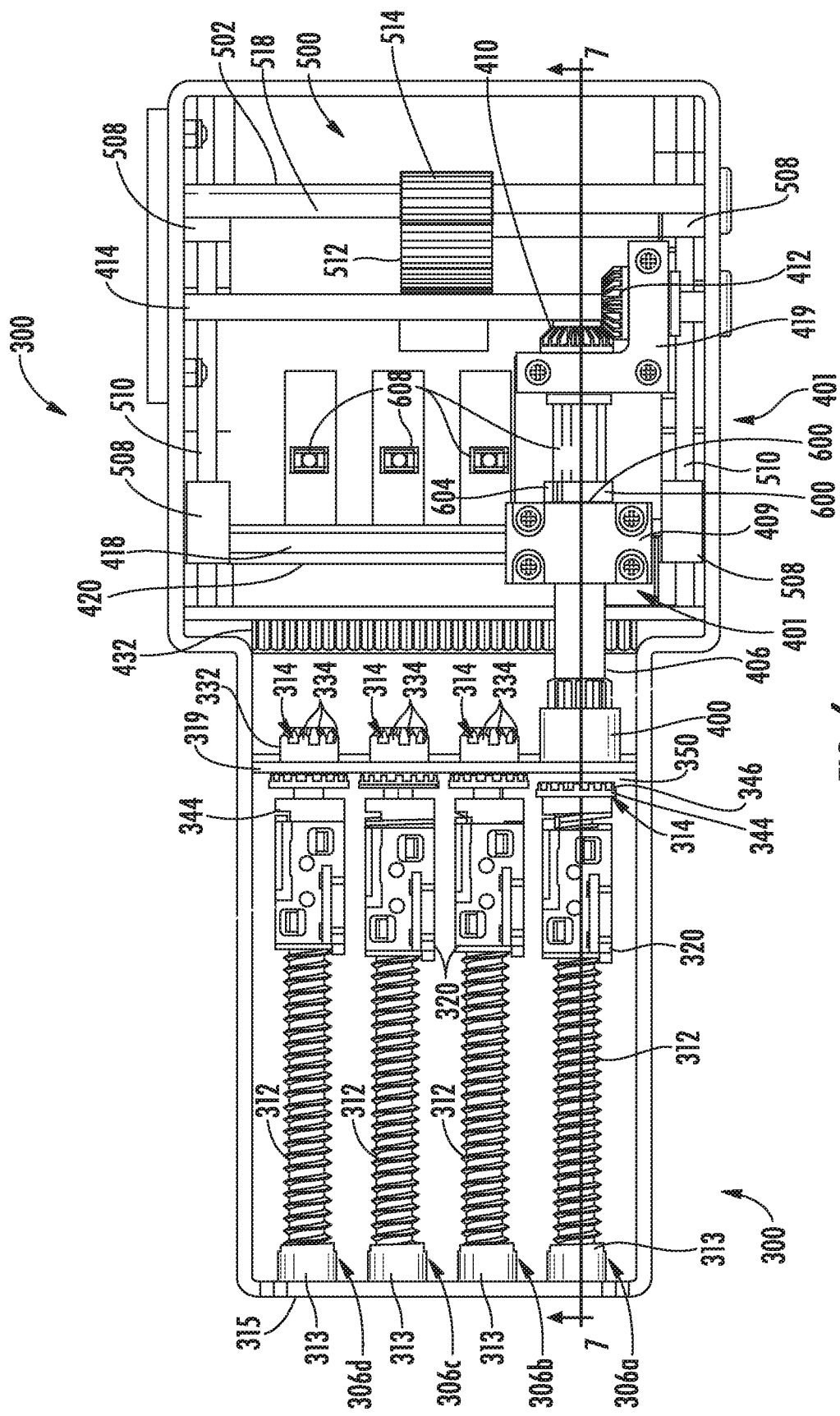
FIG. 6 is a plan view of the multi-RET actuator of FIG. 4 illustrating the drive mode.
Figure 7:
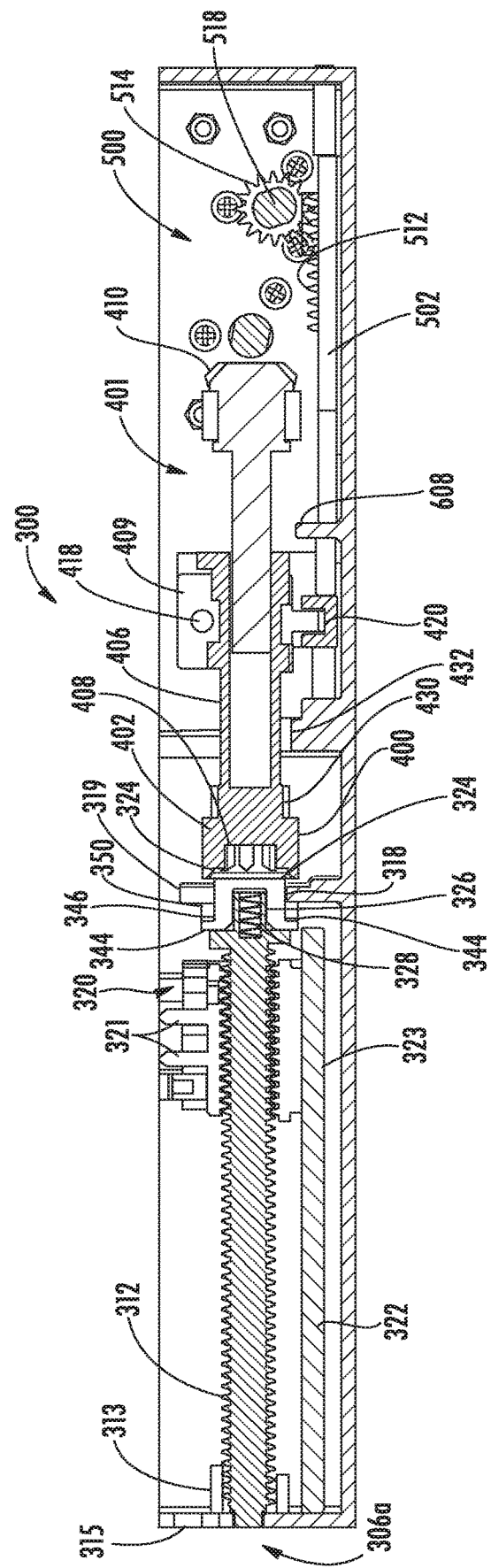
FIG. 7 is a section view taken along line 7-7 of FIG. 6.
Figure 12:
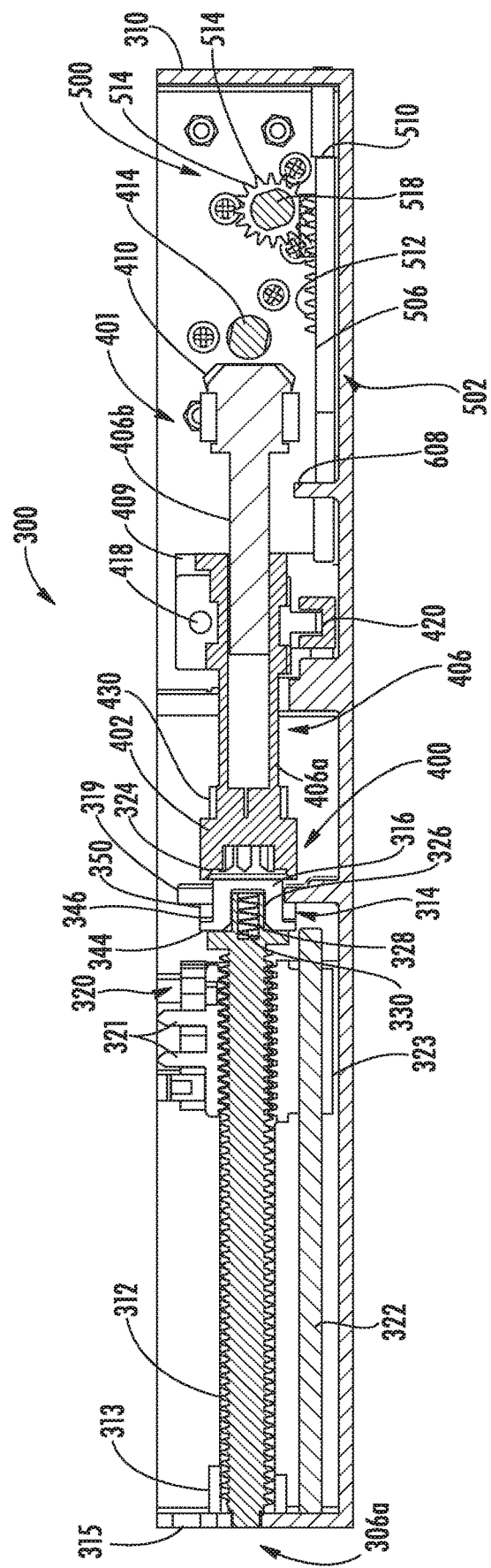
FIG. 12 is a section view similar to FIG. 7 illustrating the drive mode.

The drive/index mechanism will now be described. The drive/index mechanism comprises a drive system 401 that rotates the lead screws 312 to adjust the position of the associated phase shifter assemblies 220 and an index system 422 that changes the position of the drive system relative to the lead screws 312 of the drive assemblies 306a-306d. The drive system 401 comprises a drive shaft 406 that is rotated along its longitudinal axis. The drive connector 400 is supported at one end of the drive shaft 406 such that the drive connector 400 rotates with the drive shaft 406. The screw connector 314 and drive connector 400 are configured such that when they are engaged with one another in in the drive mode as shown in FIGS. 6, 7 and 12, the rotation of the drive shaft 406 is transferred to the lead screw 312.

The drive connector 400 comprises a generally socket shaped member 402 that receives the nub 316 of the screw connector 314. The socket 402 includes a plurality of engagement structures 408 that matingly engage with the corresponding engagement structures 334 formed on the screw connector 314 and that transfer rotary movement of the drive shaft 406 to the drive screw 312. The engagement structures 408 may be formed as a series of internal flats, splines, teeth, star connector or the like. While a specific connector is shown in the drawings comprising a series of angularly spaced teeth, any suitable connector that provides a releasable rotating connector and that allows the connectors 314 and 400 to be connected using a relative linear movement between the connectors may be used provided that the engagement structures allow for angular positioning of the drive connector 400 relative to the screw connector 314 as will hereinafter be described. In this regard, an engagement structure that comprises a plurality of discrete elements arranged in known angular positions around the rotational axis of the drive shaft 406 may be used. For example, a series of equally spaced teeth may be used as shown in the figures.

The drive shaft 406 comprises telescoping sections 406a, 406b that slide relative to one another along the longitudinal axis of the drive shaft 406 (FIGS. 12-15). While the sections 406a and 406b can telescope relative to one another, they are constrained to rotate together. For example, the interior bore of section 406a has flat surfaces that engage flat surfaces on the exterior of section 406b such that the section 406b may slide into and out of section 406a along the length thereof but the sections 406a, 406b are constrained to rotate together. Section 406a is rotatably supported in a bearing block 409 and section 406b has a bevel gear 410 formed at the end thereof remote from the connector 400. The bevel gear 410 engages a bevel gear 412 mounted on the output shaft 414 of drive/index motor 416. The output shaft 414 and the end of the drive shaft 406 may be supported in a common bearing block 419. Energization of the drive/index motor 416 rotates output shaft 414 to thereby rotate the drive shaft 406 and drive connector 400.

The bearing block 409 is supported on a trolley system comprising a rod 418 and a parallel track 420 that allow the bearing block 409 to reciprocate transversely relative to the lead screws 312 of the drive assemblies 306a-306d such that the drive shaft 406 may be aligned with any of the lead screws 312. The bevel gear 412 is mounted for reciprocating movement along the length of output shaft 414 such that the bevel gear 412 may reciprocate along the length of the output shaft 414 with the drive shaft 406 and bearing block 419. Specifically, the output shaft 414 has flat surfaces 414a that engage flat surfaces on the bevel gear 412 such that the bevel gear 412 may slide along the length of the output shaft 414 but is constrained to rotate with the output shaft 414. As a result, when the bearing blocks 409 and 419 reciprocate transversely relative to the lead screws 312 of the drive assemblies 306a-306d, the bevel gear 412 slides along the output shaft 414.

Figure 9:
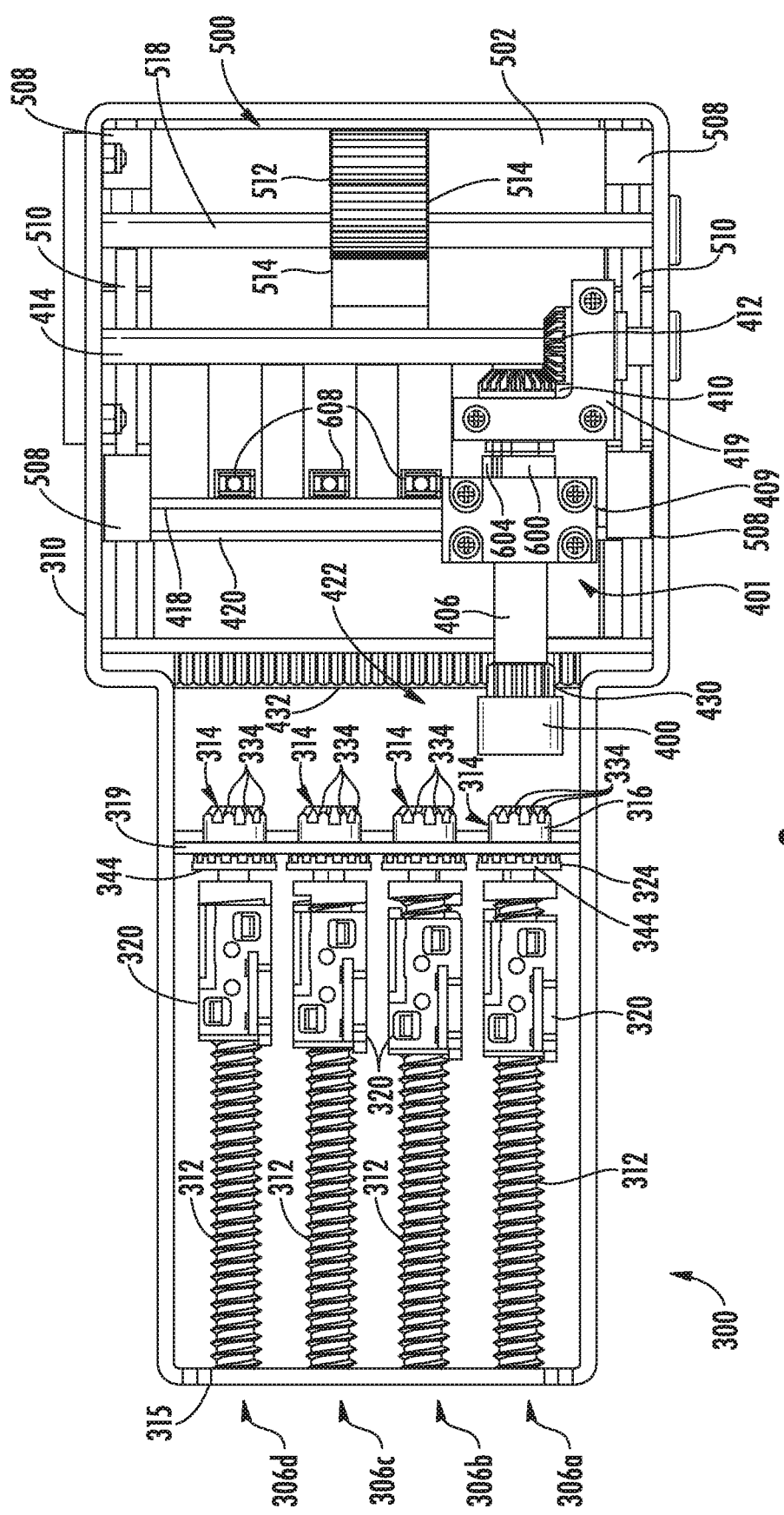
FIG. 9 is a plan view of the multi-RET actuator of FIG. 4 illustrating the index mode.
Figure 15:
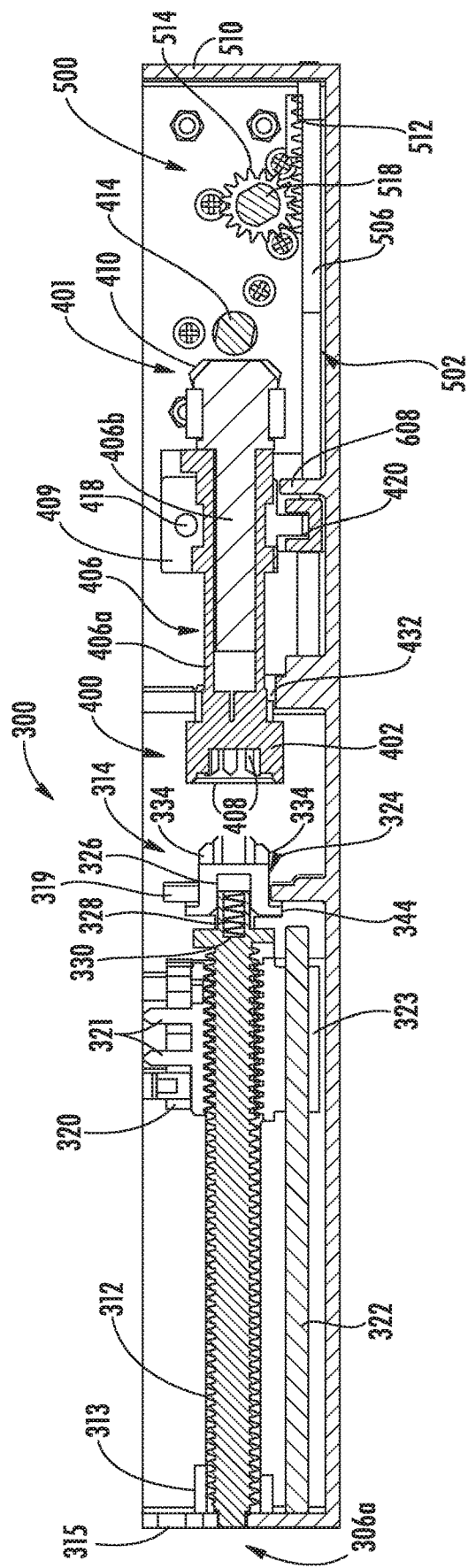
FIG. 15 is a section view similar to FIG. 7 illustrating the index mode.
Figure 16:
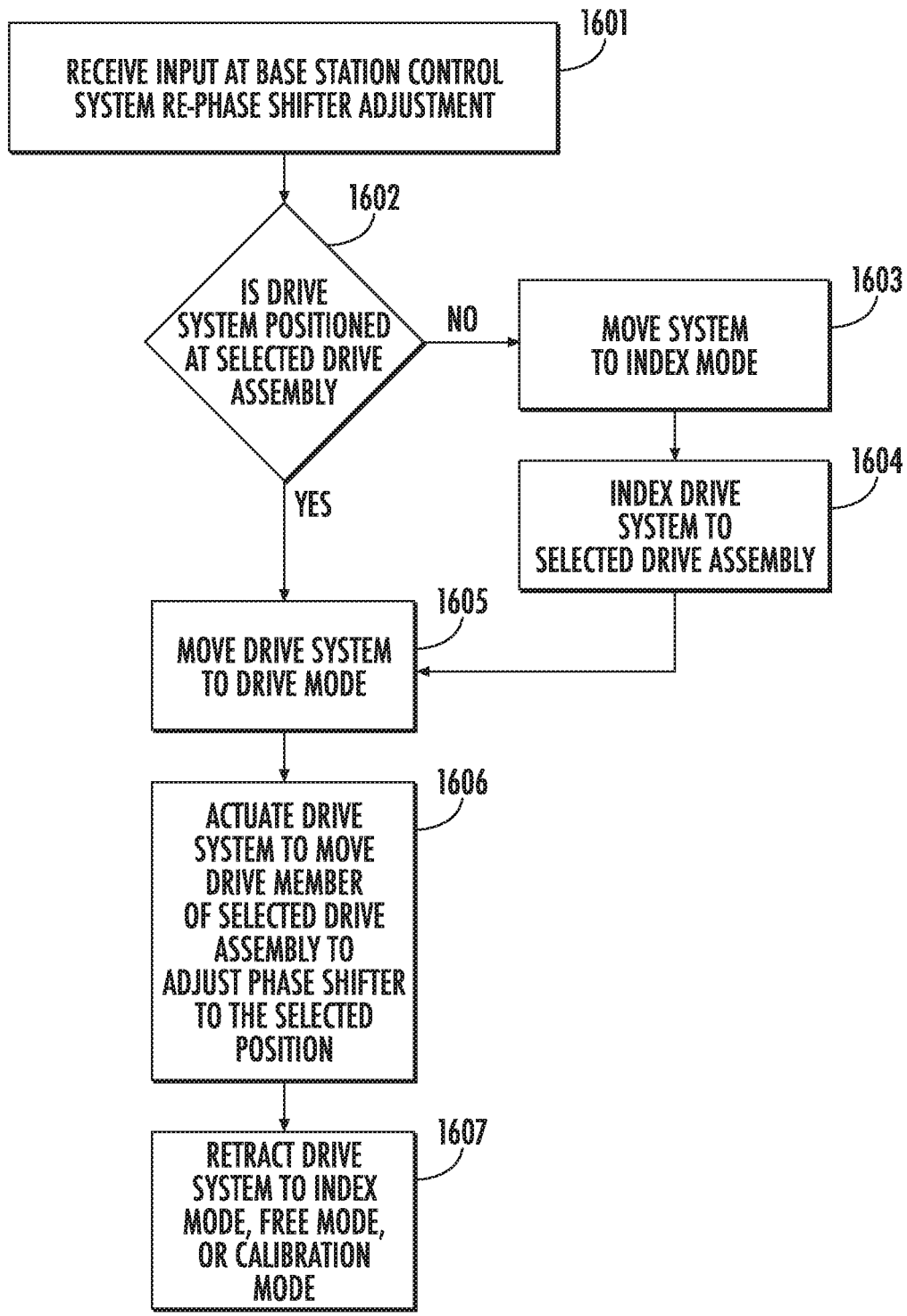
FIG. 16 is a block diagram illustrating a method of operating the system of the invention.
Figure 17:
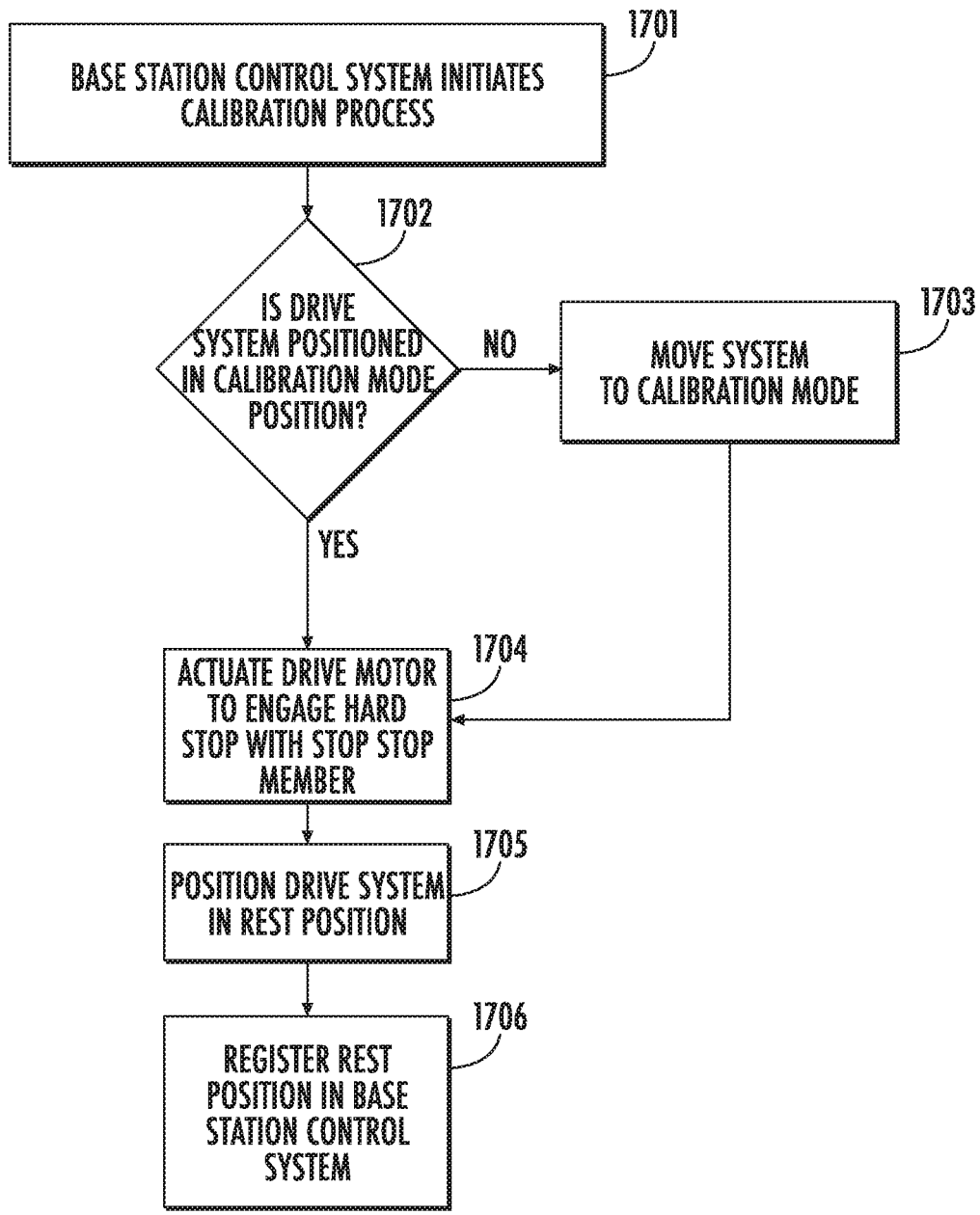
FIG. 17 is a block diagram illustrating a method of operating the calibration system of the invention.

The drive system 401 may be indexed by an index system 422 that uses the same drive/index motor 416 that rotates the drive shaft 406. The index system 422 comprises a circular gear 430 that is coaxially arranged with, and is fixed to, the drive shaft 406 such that rotation of the drive shaft 406 causes simultaneous rotation of the gear 430. A rack 432 is fixed in the housing 302 such that it is matingly engaged by the gear 430 when the device is in the index mode as shown in FIGS. 4, 9 and 15. In the index mode, the mode selection system 500 positions the gear 430 such that it engages the rack 432, as will be hereinafter described. With the gear 430 engaged with the rack 432, the actuation of the drive/index motor 416 rotates the drive shaft 406 to thereby rotate gear 430. Due to the engagement of gear 430 with the rack 432, the drive shaft 406, bearing blocks 409 and 419 and bevel gear 412 are translated transversely relative to the lead screws 312 of the drive assemblies 306a-306d to index the drive system and align the drive shaft 406 with a selected one of the lead screws 312. In the index mode, the drive connector 400 is disengaged from the screw connector 314 such that rotation of the drive shaft does not rotate any of the lead screws 312.

Information relating to the position of the drive shaft 406 relative to the drive assemblies 306a-306d is stored in the memory 254 of the base station control system 250. The base station control system 250 actuates drive/index motor 416 over communication links 302 to rotate drive shaft 406 a predetermined angular rotational distance (number of rotations) and direction to position the drive system 401 opposite the selected one of the drive assemblies 306a-306d. In some embodiments, the base station control system 250 stores in memory 254 the current position of the drive system 401. The base station control system 250 also stores the direction and angular rotational distance of the motor 416 to move the drive shaft 406 from the current position to each of the three positions aligned with the other drive assemblies 306a-306d. When a phase shifter to be adjusted is selected at the base station control system 250, via user interface 256, for example, the base station control system 250 controls motor 416 to rotate the shaft 406 the predetermined number of rotations in the proper direction to move from the stored current position to the selected position. The new selected position is then stored in memory 254 as the current position. The indexing process may be repeated to move the drive system 401 to align with any of the drive assemblies 306a-306d.

Figure 8:
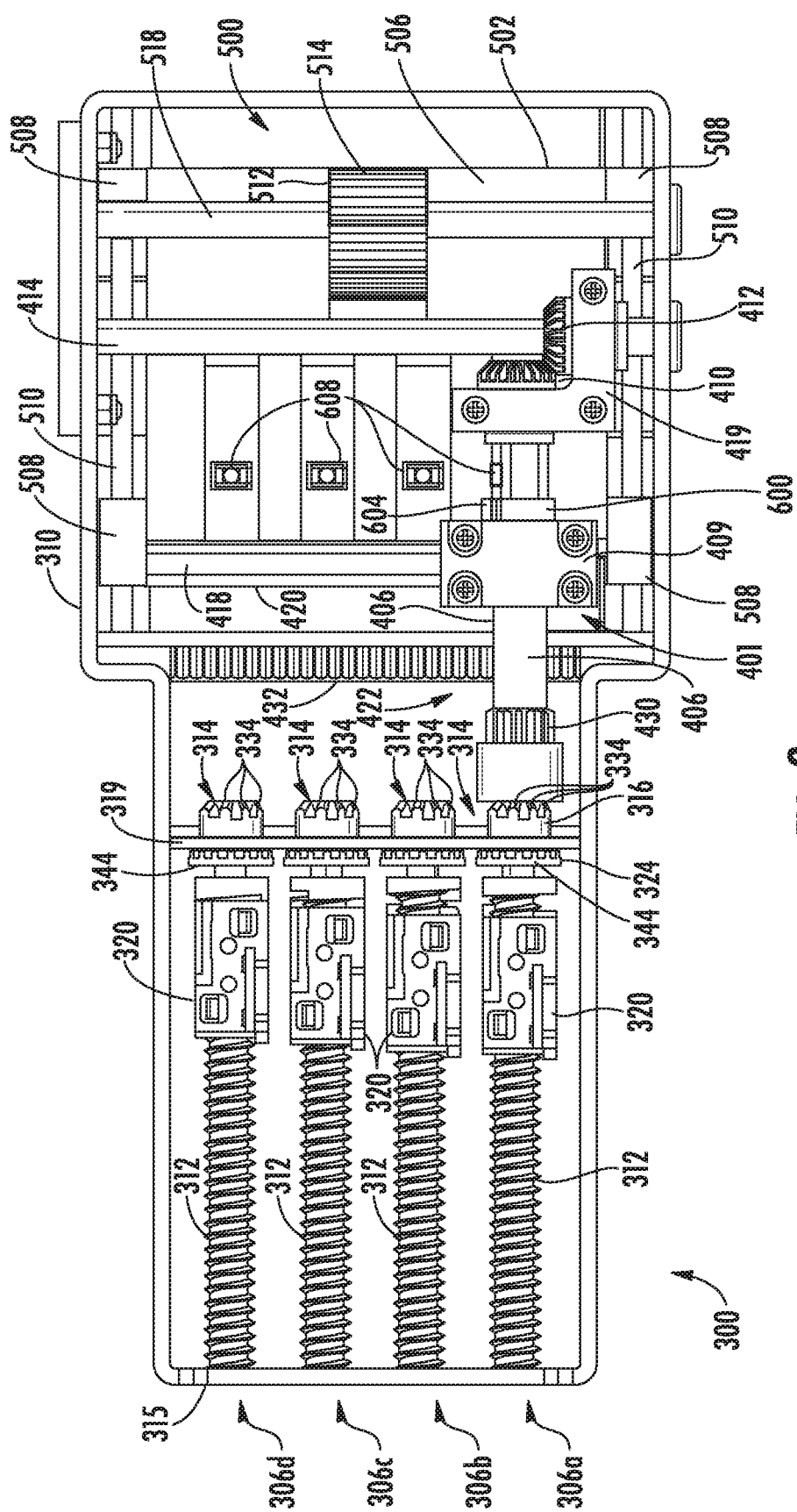
FIG. 8 is a plan view of the multi-RET actuator of FIG. 4 illustrating the free mode.
Figure 10:
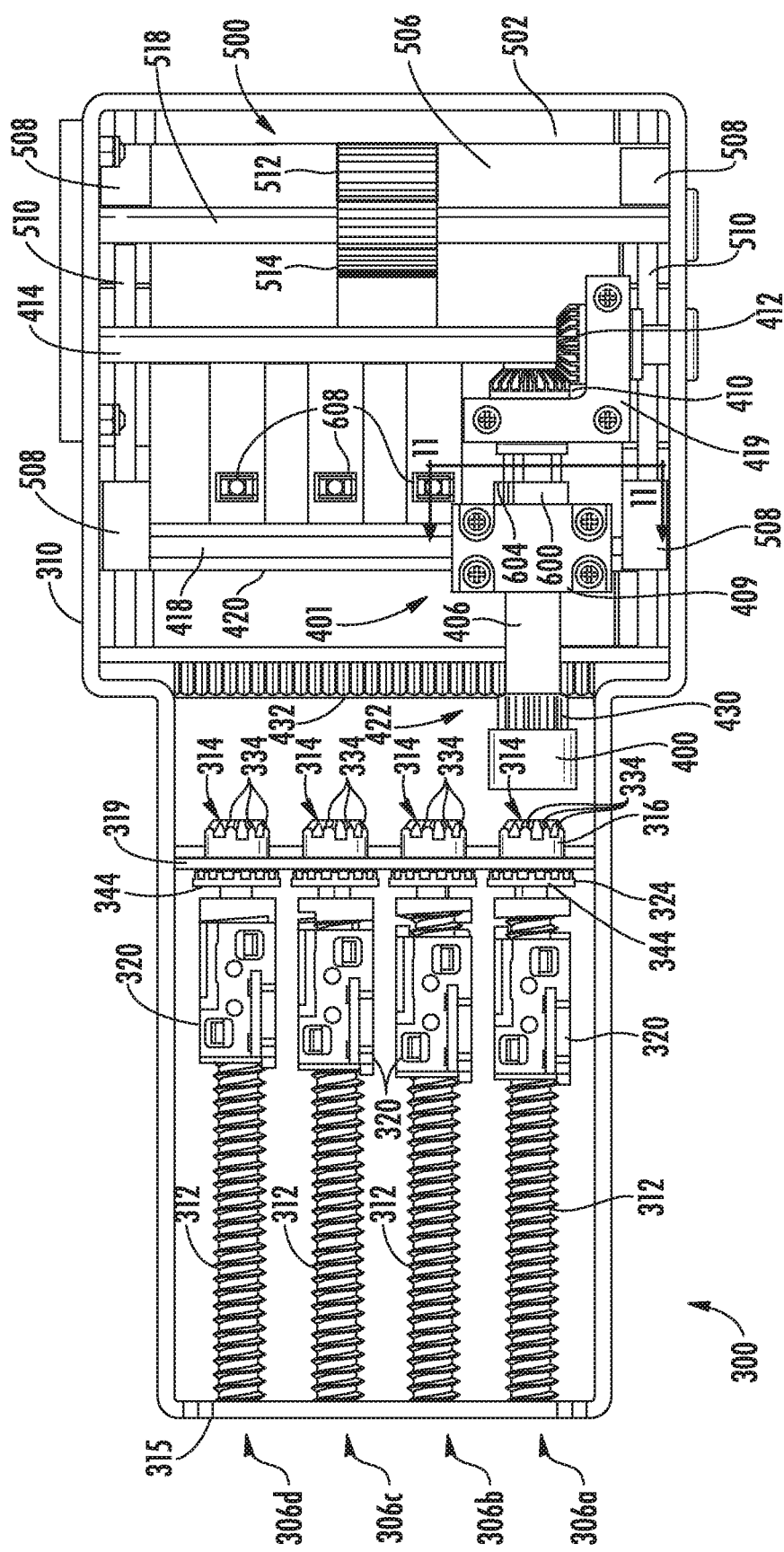
FIG. 10 is a plan view of the multi-RET actuator of FIG. 4 illustrating the calibration mode.
Figure 11:
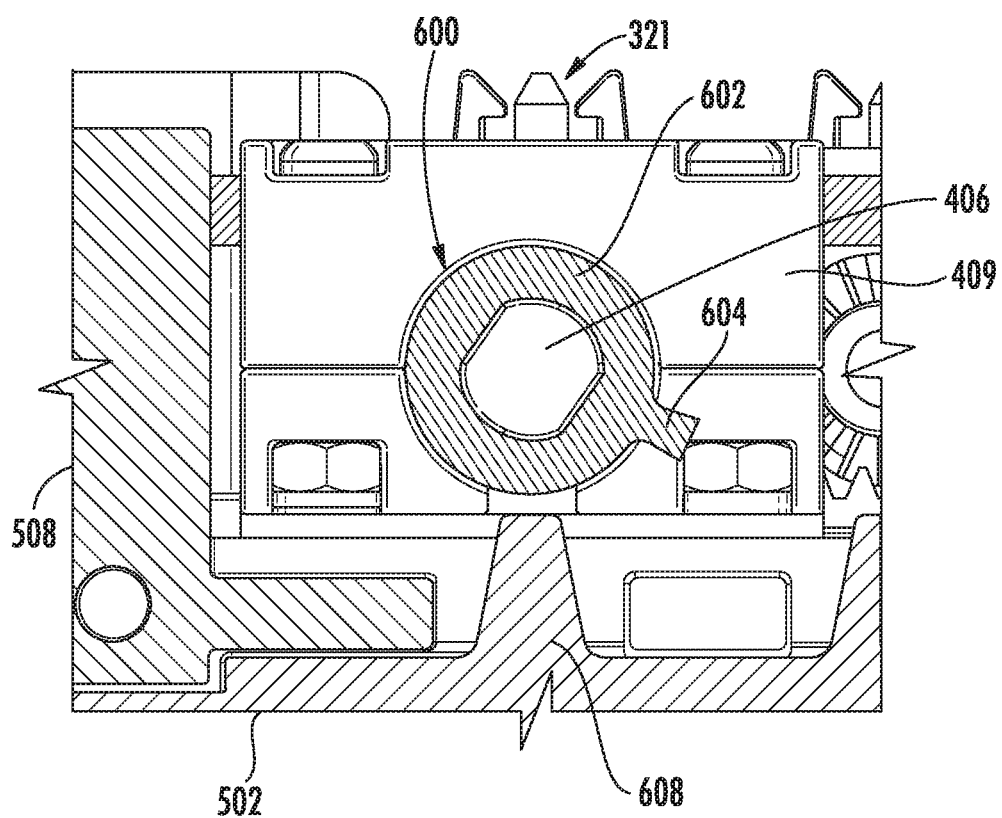
FIG. 11 is a detailed section view taken along line 11-11 of FIG. 10.
Figure 13:
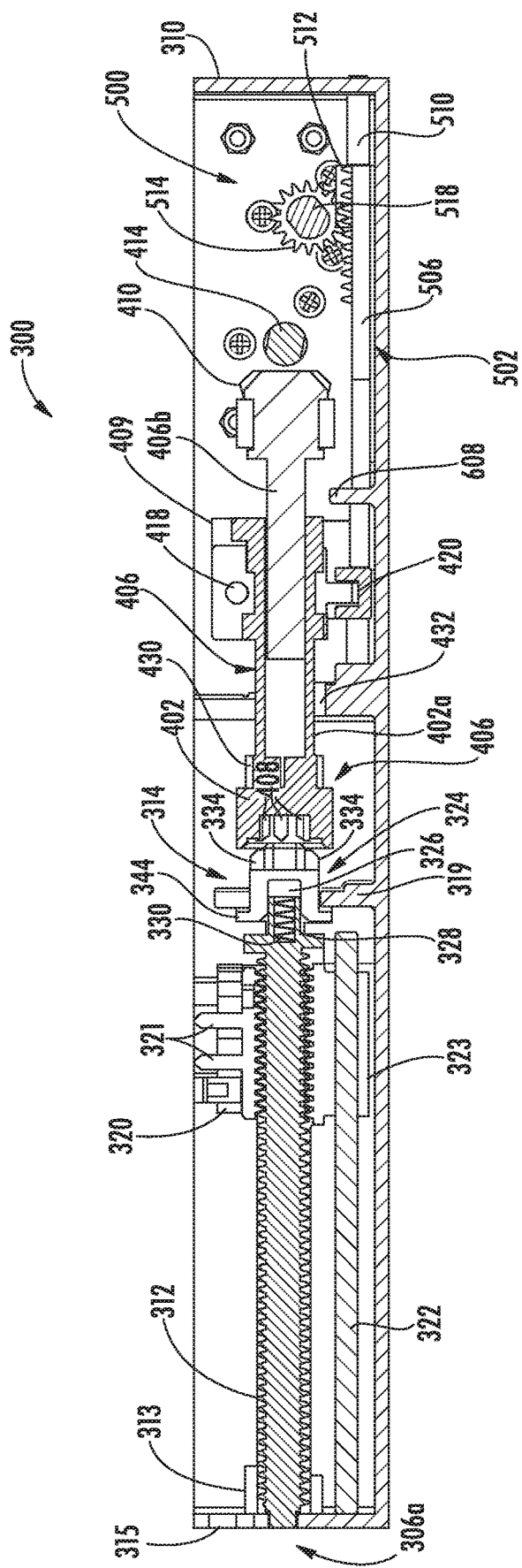
FIG. 13 is a section view similar to FIG. 7 illustrating the free mode.
Figure 14:
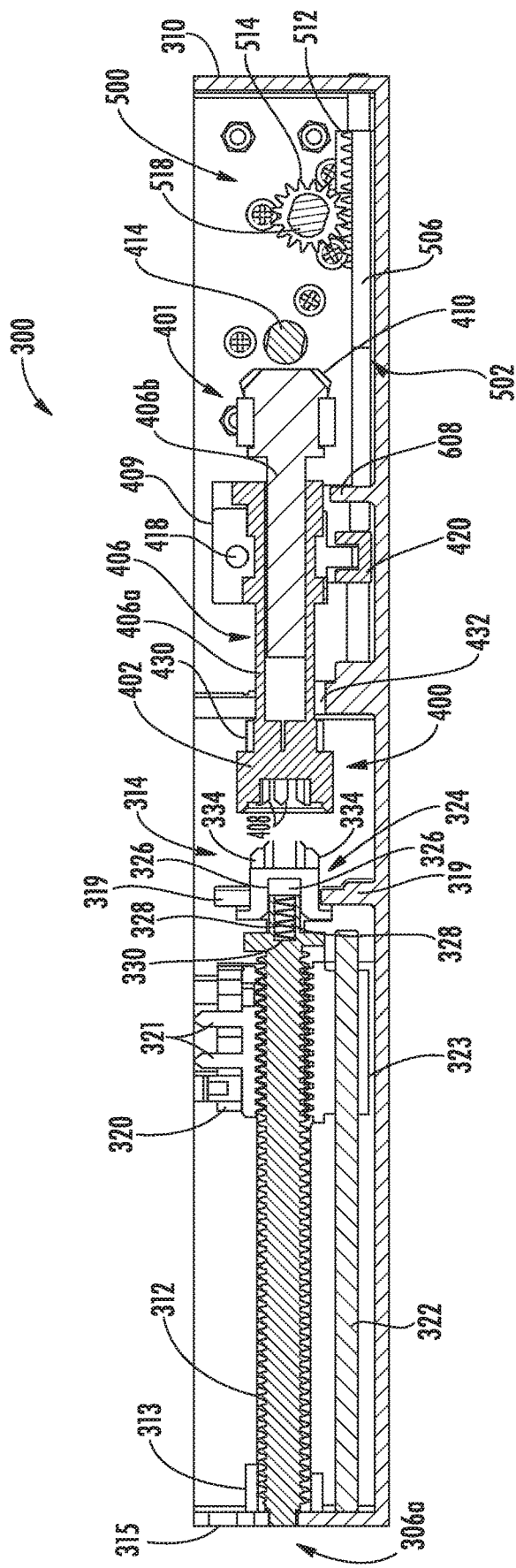
FIG. 14 is a section view similar to FIG. 7 illustrating the calibration mode.

The mode selection system 500 will now be described. The mode selection system 500 moves the drive system 401 between one of four positions or modes—drive mode, index mode, calibration mode and free mode. In the drive mode, the drive system 401 is moved fully toward the lead screws 312 of the drive assemblies 306a-306d such that the screw connector 314 is engaged by the drive connector 400 as shown in FIGS. 6, 7 and 12. In the drive mode position, rotation of the drive shaft 406 rotates the lead screw 312 to adjust the position of the wiper printed circuit board 220, 220a of the phase shifter assembly 200 operatively coupled to that lead screw 312. In the index mode, the drive system 401 is moved to the index mode position in which gear 430 engages the rack 432 as shown in FIGS. 4, 9 and 15. In this position, rotation of the drive shaft 406 indexes the drive system 401 transversely relative to the lead screws 312 to align the drive shaft 406 with one of the lead screws 312 of the drive assemblies 306a-306d. In the calibration mode, the drive system 401 is moved to a calibration position in which gear 430 is disengaged from the rack 432 and the drive connector 400 is disengaged from the screw connector 314 as shown in FIGS. 10, 11 and 14. In the calibration mode position, rotation of the drive shaft 406 is used to calibrate the system as will hereinafter be described. The system may also be indexed to a fourth free mode position. In the free mode, the drive system 401 is moved to a position in which gear 430 is disengaged from the rack 432, the drive connector 400 is disengaged from the screw connector 314 and the device is not in the calibration mode as shown in FIGS. 8 and 13. In the free mode, the drive shaft 406 can turn freely without affecting operation of the system.

The mode selection system 500 comprises a linearly reciprocating sled 502 that supports the drive shaft 406 and bearing block 409 and trolley 418, 420. Movement of the sled 502 reciprocates the drive system 401 between the index mode, drive mode, calibration mode and free mode, described above. The sled 502 comprises a generally planar platform 506 that supports the drive shaft 406 and bearing block 409 and trolley 418, 420. The sled 502 includes bearing blocks 508 that are connected to the platform 506 and are slidably supported on rods 510. The rods 510 extend parallel to the lead screws 312 such that the sled 502 and drive system 401 may be reciprocated linearly between the index mode, drive mode, calibration mode and free mode as the bearing blocks 508 slide on the rods 510. To effectuate movement of the sled 502, a rack 512 is fixed to the platform 506 that extends in the direction of travel of the sled 502, parallel to the rods 510. A pinion 514 is supported on and rotates with output shaft 518 of mode selection motor 520. The mode selection motor 520 and output shaft 518 are fixed in the housing 302 such that rotation of the output shaft 518 rotates the pinion 514 and causes the sled 502 to reciprocate linearly towards and away from the lead screws 312 of the drive assemblies 306a-306d. As the sled 502 reciprocates, the bearing block 409 moves with the sled and the shaft sections 406a and 406b telescopically move relative to one another to accommodate movement of the sled 502 and the bearing block 409 relative to the bearing block 419.

Information relating to the relative position of sled 502 is stored in the memory 254 of the base station control system 250 for each of the four positions or modes—drive mode, index mode, calibration mode and free mode. The base station control system 250 actuates the mode selection motor 520 to rotate output shaft 518 a predetermined angular distance to position the drive system 401 in the selected one of the four modes. In some embodiments, the base station control system 250 saves the position of the motor 520 correlating to the four mode positions and rotates the motor 520 to the correct position based on the selected mode. The motor 520 may provide feedback to the base station control system indicative of the motor position over links 302. In other embodiments, the base station control system 250 saves in memory the current position of the mode system and the direction and angular rotation of the shaft 518 to move the sled 502 to each of the four mode positions such that when a mode is selected, the base station control system 250 rotates the output shaft 518 the predetermined number of rotations in the proper direction to move from the saved current position to the selected position. The new selected position is then saved as the current position.

The operation of the multi-RET actuator 300 to adjust a phase shifter will be described. It is to be understood that the system operates in a repetitive manner such that any position of the system may be considered the starting point and the system may move between the four modes of operation based control signals from the base station control system 250. To adjust the position of a wiper printed circuit board 220, 220a of a selected one of the phase shifter assemblies 200, the desired adjustment is received as an input by the user interface 256 of the base station control system 200 (Block 1601). The input may include an identification of the selected phase shifter assembly and the adjustment level. The adjustment level may be input as direction and angle of change of the wiper printed circuit board 220, 220a or it may be input as a phase taper or using other data. The adjustment level is used by the base station control system 250 to identify the wiper printed circuit board/drive assembly 306a-306b to be adjusted and the amount and direction of rotation of the lead screw 312 that corresponds to the adjustment level. The base station control system 250 controls the index system 422 and the mode selection system 500 to position the drive system 401 adjacent the lead screw 312 of the drive assembly 306a-306d that is operatively coupled to the phase shifter assembly to be adjusted. The base station control system 250 determines if the drive system 401 is positioned at the selected drive assembly 306a-306d (Block 1602). If the drive system 401 is positioned at the selected drive assembly 306a-306d, no indexing of the drive system is required. If the drive system 401 is not positioned at the selected drive assembly 306a-306d, the base station control system 250 actuates the mode selection motor 520 to move the sled 502 to the index mode position where the circular gear 430 is engaged with the rack 432 as shown in FIGS. 4, 9 and 15 (Block 1603). If the system is in the index mode position, the mode selection motor is not actuated. The index/drive motor 416 is then actuated to rotate the drive shaft 406 and circular gear 430 to move the drive system to the selected drive assembly 306a-306d (Block 1604). Engagement of the rotating circular gear 430 with the stationary rack 432 indexes the drive system 401 transversely relative to the lead screws 312 of drive assemblies 306a-306d. The index/drive motor 416 is energized until the drive shaft 406 and drive connector 400 are aligned with the lead screw 312 that is operatively coupled to the selected phase shifter assembly 200. The index/drive motor 416 is deactivated.

The mode selection system 500 is then used to move the RET actuator to the drive mode where the drive connector 400 engages the screw connector 314 (Block 1605). Specifically, the, the base station control system 250 actuates mode selection motor 520 to move the sled 502 toward the selected drive assembly such that the drive connector 400 engages the screw connector 314 of the lead screw 312 of the selected drive assembly 306a-306d as shown in FIGS. 6, 7 and 12. The engagement structures 408 on the drive connector 400 engage the engagement structures 334 on the screw connector 314. As the drive connector 400 is moved into engagement with the screw connector 314, a force is applied to the coupling member 324 that moves the coupling member 324 against the bias of spring 328 such that the teeth 346 on the screw connector 314 are disengaged from the teeth 350 on the wall 319, as shown with drive assembly 306a in FIG. 6. In this positon, the screw connector 314 and the lead screw 312 are free to rotate.

The base station control system 250 actuates the drive system 401 to move the wiper printed circuit board of the phase shifter assembly to the desired position (Block 1606). Drive/index motor 416 is energized to rotate drive shaft 406 and the coupled lead screw 312. As the lead screw 312 rotates, the drive nut 320 is moved linearly along the length of the lead screw. Linear movement of the drive nut 320 is transmitted to the mechanical linkage that is connected to the wiper printed circuit board 220, 220a of the selected phase shifter assembly such that movement of the drive nut 320 results in a rotational and/or linear adjustment of the wiper printed circuit board. The adjustment of the wiper printed circuit board may be made in angle of adjustment for pivoting wiper printed circuit boards or in linear distance for linearly moveable wiper printed circuit boards. In either event, the movement of the wiper printed circuit board is correlated to a number of revolutions of the lead screw 312. Accordingly, the base station control system 250 controls the rotation of the drive shaft 406 to rotate the lead screw 312 in the proper direction and number of revolutions to make the selected adjustment. The base station control system 250 stores in memory 254 the current position of each of the wiper printed circuit boards. When an adjustment to the position of one of the wiper printed circuit boards is required, the control system 250 determines (by calculation, look up table or the like) the number of rotations and direction of rotation of the lead screw 312 and drive shaft 406 that corresponds to the selected position. The index/drive motor 416 is actuated to rotate the drive shaft 406 and lead screw 312 the determined number of rotations in the desired direction of rotation to move the wiper printed circuit board to the selected position. The selected position is then stored in memory 254 as the current position.

It will be appreciated that a relationship exists between the number of rotations of the lead screw 312 and the linear distance traversed by the drive nut 320 along the lead screw 312 and the corresponding distance moved by the mechanical linkage. The distance moved by the mechanical linkage corresponds to a known movement of the wiper printed circuit board. Thus, a rotational movement of the lead screw 312 correlates to a known movement of the associated wiper printed circuit board. Therefore, to adjust the position of the wiper printed circuit board of a phase shifter assembly, the lead screw 312 operatively coupled to that wiper printed circuit board is rotated by the drive motor 416 the corresponding number of rotations in the correct direction. In systems where the wiper printed circuit board of the phase shifter assembly moves linearly rather than rotationally, the rotational movement of the lead screw 312 correlates to a linear movement of the wiper printed circuit board. In all events, the rotational movement of the lead screw 312 corresponds to a known movement of the wiper printed circuit board of the phase shifter assembly such that the movement and position of the wiper printed circuit board may be controlled by a known rotational movement of the lead screw 312. To position the wiper printed circuit board, the lead screw 312 is rotated by the index/drive motor 416 a known number or rotations or degrees of rotation in the correct direction. When the desired position of the lead screw 312 is reached, the index/drive motor 416 is turned off.

The drive system 401 may then be retracted to the index mode position, free mode position or calibration mode position (Block 1607). The drive system 401 is retracted by energizing the mode selection motor 520 to drive gear 514 in engagement with rack 512. When the drive system 401 is retracted, the force exerted on the spring 328 by the drive system is removed such that the spring 328 moves the coupling member 324 to the extended position where the teeth 346 on the coupling member 324 engage the stationary teeth 350 on the wall 319 to hold the lead screw 312 in the selected position. The process may be repeated for any phase shifter assembly that needs to be adjusted and may be repeated for each phase shifter assembly.

In one embodiment, each screw connector 314 is provided with eight engagement structures 334, spaced 45 degrees apart. Each drive connector 400 is also provided with eight mating engagement structures 408 spaced 45 degrees apart. The lead screws 312 are always located at rest in one of eight positions with the eight engagement structures 334 in the same relative angular positions. The lead screws 312 may be rotated a minimum of 45 degrees, i.e. rotating the lead screw the angular distance between two adjacent engagement structures 334, and may be rotated through angles that are multiples of 45 degrees. In one embodiment, an angular rotation of 45 degrees of the lead screw 312 may translate to a 0.2 mm adjustment of the wiper printed circuit board based on the geometry of the system. However, the relationship between the angular rotation of the lead screws 312 and the adjustment of the wiper board may be varied. Moreover, a greater number or fewer number of engagement structures may be used to thereby increase or decrease the minimum angular adjustment of the lead screws 312.

The drive system 401 may rotate the lead screw 312 in multiples of 45 degrees of rotation based on the desired adjustment of the wiper printed circuit board. As a result, the screw connector 314 is always positioned at rest with the engagement structures 334 positioned in the same relative angular position. The screw connector 314 and associated lead screw 312 are held in the rest position by the engagement of the locking members 346 and stationary locking members 350. It will be appreciated that in the rest position, the screw connector 314 is always positioned with the engagement members 334 occupying the same relative angular position; however, the position of the wiper printed circuit board will vary based on the rotation of the associated lead screw. Thus, if the lead screw 312 is rotated 360 degrees, the engagement members 334 are in the same angular position but the drive nut 320 will have been moved up or down the length of the lead screw 312 and the position of the wiper printed circuit board will have been adjusted. Similarly, if the lead screw 312 is rotated 540 degrees the engagement members 334 are in the same relative angular position, but rotated 180 degrees in absolute position, and the drive nut 320 will have been moved a corresponding distance up or down the length of the lead screw 312 and the position of the wiper printed circuit board will have been adjusted accordingly.

The drive connector 400 must be aligned with the screw connector 314 to allow the engagement members 408 of the drive connector 400 to engage the engagement members 334 of the screw connector 314 without interference. Thus, the drive connector 400 must be, at rest, at the same rest position as the screw connector 314. It is to be understood that the rest position of the drive connector may be any one of a plurality of angular positions of the drive connector where the drive connector is aligned with the screw connector and that any one of the angular positions may be the rest position. The engagement structures on the drive connector are aligned with the engagement structures on the screw connector when the drive connector is in the rest position. As previously explained with respect to the screw connector, the rest position of the drive connector may correspond to anyone of a plurality of angular positions of the drive connector. For example, each drive connector 400 may be provided with eight mating engagement structures 408 spaced 45 degrees apart where the drive connector 400, when in the rest position, may be located in anyone of the eight positions with the eight engagement structures 408 in the same relative angular positions. If the drive connector 400 is offset from the rest position, when the drive connector 400 is moved into engagement with the screw connector 314, the engagement members 408 of the drive connector 400 may interfere with the engagement members 334 of the screw connector 314 as the coupling between the connectors is made. If this interference between the engagement members 408 of the drive connector 400 and the engagement members 334 of the screw connector 314 occurs, the drive connector 400 may cause the screw connector 314, and the associated lead screw 312, to inadvertently rotate. Repeated engagement and disengagement of the screw connector 314 with an out of alignment drive connector 400 can, over time, introduce errors in the position of the wiper printed circuit board of the phase shifter assembly. These positioning errors may also be compounded because the next adjustment of an out of position wiper printed circuit board is based on an inaccurate starting position. These errors in the positioning and repositioning of the wiper printed circuit board may be undetected by the system operator until performance issues arise.

The drive shaft 406 and drive connector 400 may come to a stop at a position other than the rest position over repeated actuations due to inherent inaccuracies in the drive motor 416 and transmission assembly to the drive connector 400. The system of the invention provides a calibration mode to ensure that the drive system 401 and drive connector are properly aligned in the rest position. The calibration process may be performed during system set up to ensure that the drive connector 400 is properly positioned. The calibration process may also be performed periodically during use of the system to ensure that the drive system and drive connector remain properly aligned. For example, the calibration process may be performed as directed by the system operator or after a predetermined number of cycles, e.g. 1000 cycles, to maintain the proper alignment of the system in the field.

To calibrate the system, the system operates in the calibration mode. To initiate calibration of the system, a calibration command may be received by the user interface 256 of the base station control system 200. Alternatively, the base station control system 250 may automatically calibrate the system based on cycles of operation, time or other factors stored in memory 254. In either event, the base station control system 200 initiates the calibration process (Block 1701). The base station control system 250 determines if the drive system is positioned at the calibration mode position (Block 1702). If the drive system is positioned at the calibration mode position, the mode selection system is not utilized. If the drive system is not positioned at the calibration mode position, the base station control system 250 actuates the mode selection motor 520 to move the sled 502 to the to the calibration position (Block 1703). In the illustrated embodiment, the calibration position is between the drive position and the indexing position. The calibration position is shown in FIGS. 10, 11 and 14 where the drive connector 400 is not engaged with the screw connector 314 and the circular gear 430 is not engaged with the rack 432. While in the illustrated embodiment, the calibration position is an intermediate position that is physically between the drive position and the index position, in some embodiments, the calibration position may be, for example, behind the index position provided that the drive connector 400 is not engaged with the screw connector 314 and the circular gear 430 is not engaged with the rack 432. In the calibration position, actuation of the drive motor 416 rotates the drive shaft 406 but does not index the drive system and does not rotate any of the lead screws 312.

Referring more particularly to FIG. 11, a positioning member 600 is mounted for rotation with the drive shaft 406. In the illustrated embodiment, the positioning member 600 is in the form of a ring 602 mounted on the shaft 406 for rotation therewith. A stop member 604 in the form of a tab or ear extends from the ring 602. When the drive shaft 406 is rotated and the drive system is in the calibration mode, the stop member 604 is positioned to strike a hard stop 608. In the illustrated embodiment, the hard stop 608 comprises a projection that extends upwardly from the housing 310. In the illustrated embodiment, one hard stop 608 is associated with each lateral position of the drive system 401 such that calibration may be performed with the drive system aligned with any of the lead screws 312. In other embodiments, a single hard stop 608 may be provided where the calibration process may only be performed after the drive system is indexed to that position.

The base station control system 250 energizes the index/drive motor 416 until the stop member 604 hits the hard stop 608 (Block 1704). This position is a known angular position of the drive connector 400. This known position may be the rest position of the drive connector 400 or it may be a position at a known or predetermined angular distance from the rest position of the drive connector 400. If the known position is the rest position of the drive connector 400, the drive connector is properly located and is positioned at the rest position. If the known position is a known angular distance from the rest position, the drive shaft 406 is rotated by the drive/index motor 416 the known or predetermined angular distance to locate the drive shaft 406 and drive connector 400 at the rest position (Block 1705). The software registers the calibrated position as the rest position and future rotation of the drive shaft to adjust the lead screws 312 is calculated from this position (Block 1706). The next adjustment of the wiper printed circuit board is made from the true rest position thereby eliminating errors due to an out of alignment drive system.

The system of the invention is scalable such that a greater or fewer number of drive assemblies 306 may be provided. In some embodiments, the RET adjuster may be a single RET adjuster with a single drive assembly where the index system may be eliminated. The calibration system as described herein may be used with a single RET system having a single drive assembly. The RET adjuster of the invention also has a narrow profile such that it is better able to fit in the limited space of an antenna. The low profile is provided, in part, because the drive system elements are in a common plane. As shown in the figures, the motors 416, 520 shafts 406, 414, and 518 and the drive assemblies 306 are all in a common plane such that the RET adjuster has a very small depth dimension.

The present invention has been described above with reference to the accompanying drawings. The invention is not limited to the illustrated embodiments; rather, these embodiments are intended to fully and completely disclose the invention to those skilled in this art. In the drawings, like numbers refer to like elements throughout. Thicknesses and dimensions of some elements may not be to scale.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression "and/or" includes any and all combinations of one or more of the associated listed items.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The invention claimed is:

1. A remote electronic tilt (RET) adjuster comprising:
    a drive assembly comprising a rotatable drive member operatively connected to a phase shifter assembly such that rotation of the drive member adjusts the phase shifter assembly;
    a first connector coupled to the drive member, the first connector occupying a first rest position when the drive member is at rest;
    a drive system comprising a second connector occupying a second rest position when the drive system is at rest, the second connector being releasably engageable with the first connector such that actuation of the drive system selectively rotates the drive member;
    a mechanical calibration system that is configured to locate the second connector at the second rest position.

2. The RET adjuster of claim 1 wherein the drive system comprises a drive shaft connected to the second connector and a motor for rotating the drive shaft, and wherein the calibration system comprises a stop member rotatable with the second connector.

3. The RET adjuster according to claim 2 wherein the calibration system comprises a hard stop engageable by the stop member, wherein when the stop member is engaged with the hard stop, the position of the second connector is a known angular position relative to the second rest position.

4. The RET adjuster according to claim 3 further comprising a base station control system comprising a processor and a memory for storing the known angular position.

5. The RET adjuster according to claim 3 wherein a mode selection system moves the drive system between a first position where the stop member is positioned to engage the hard stop and a second position where the stop member is not positioned to engage the hard stop, wherein the first connector engages the second connector when the drive system is in the second position.

6. The RET adjuster according to claim 2 wherein the drive shaft is supported in a bearing block, wherein the drive shaft has a first bevel gear on one end thereof remote from the second connector, the first bevel gear engaging a second bevel gear on an output shaft of the motor, wherein the second bevel gear is mounted for reciprocating movement on the output shaft such that the second bevel gear may reciprocate along the output shaft.

7. The RET adjuster according to claim 2 wherein the drive shaft has a first section and a second section, the first section arranged for linear movement relative to the second section.

8. The RET adjuster according to claim 1 wherein the drive member comprises a lead screw, and wherein a drive nut is threadably engaged with the lead screw, the drive nut being operatively connected to the phase shifter assembly.

9. The RET adjuster of according to claim 1 further comprising a plurality of drive assemblies operatively connected to a plurality of phase shifter assemblies such that each drive assembly of the plurality of drive assemblies adjusts at least one phase shifter assembly of the plurality of phase shifter assemblies.

10. The RET adjuster according to claim 9 wherein the drive system is supported for reciprocating movement transverse to the plurality of drive assemblies such that the drive system may be aligned with any one of the plurality of drive assemblies.

11. The RET adjuster according to claim 1 wherein the second connector is engageable with the first connector by a linear movement of the drive system relative to the drive member.

12. The RET adjuster according to claim 1 wherein the first connector comprises a coupling member mounted on the end of the drive member for reciprocating motion relative thereto, the coupling member rotating with the drive member, and further comprising a spring that exerts a force on the coupling member that biases the coupling member toward the second connector.

13. The RET adjuster according to claim 12 wherein the coupling member comprises a plurality of engagement structures arranged in spaced relationship about an axis of rotation of the coupling member.

14. The RET adjuster according to claim 12 wherein the coupling member comprises a locking member that engages a stationary locking member to fix the drive member in position and wherein the spring moves the locking member into engagement with the stationary locking member, wherein the engagement of the first connector with the second connector disengages the locking member from the stationary locking member.

15. The RET adjuster according to claim 1 wherein the first connector comprises a plurality of first engagement structures arranged about a rotational axis of the first connector and wherein the second connector comprises a plurality of second engagement structures that matingly engage the plurality of first engagement structures on the first connector, wherein the plurality of second engagement structures are arranged about a rotational axis of the second connector.

16. The RET adjuster of according to claim 1 wherein a mode selection system moves the drive system between a drive mode, an index mode and a calibration mode, and wherein the mode selection system comprises a linearly reciprocating sled that supports the drive system wherein movement of the sled reciprocates the drive system between a first position, a second position and a third position and wherein a rack is fixed to the sled that is engaged by a pinion driven by a mode selection motor.

17. The RET adjuster according to claim 1 wherein a mode selection system moves the drive system such that the first connector engages the second connector and moves a gear into engagement with a fixed rack.

18. A method of calibrating a remote electronic tilt (RET) adjuster, the RET adjuster comprising: a movable drive member operatively connected to a phase shifter assembly such that movement of the drive member adjusts the phase shifter assembly; a first connector coupled to the drive member, the first connector occupying a first rest position when the drive member is at rest; a drive system comprising a movable drive shaft and a stop member mounted for movement with the drive shaft, the drive shaft supporting a second connector, the second connector occupying a second rest position when the drive system is at rest; and the second connector being releasably engageable with the first connector such that actuation of the drive system moves the drive member, the method comprising:
actuating the drive system to rotate the stop member into engagement with a stationary stop, the stationary stop positioned such that when the stop member contacts the stationary stop the second connector is in a known position;
using the known position to locate the second connector at the second rest position.

19. The method of claim 18 wherein the known position is the second rest position or wherein the known position is a known angular distance from the second rest position.

20. The method according to claim 18 wherein actuating the drive system rotates the drive shaft and the stop member.

21. The method according to claim 18 further comprising storing the second rest position in a memory of a base station control system.

22. A method of operating a multi-remote electronic tilt (RET) adjuster, the multi-RET adjuster comprising: a plurality of rotatable drive members wherein each of the plurality of rotatable drive members is operatively connected to an associated phase shifter assembly such that rotation of one of the plurality of drive members adjusts a respective associated phase shifter assembly; a first connector coupled to each of the plurality of drive members, each first connector occupying a first rest position when a respective drive member is at rest; a drive system comprising a second connector occupying a second rest position when the drive system is at rest, the second connector being releasably engageable with each first connector such that actuation of the drive system moves a respective drive member; the method comprising;
positioning the drive system adjacent to one of the plurality of rotatable drive members, the one of the plurality of rotatable drive members being operatively coupled to a phase shifter assembly to be adjusted;
moving the drive system such that the second connector engages the first connector of the one of the plurality of rotatable drive members;
actuating the drive system to adjust the phase shifter assembly.

23. The method of claim 22 wherein the step of positioning the drive system adjacent to one of the plurality of rotatable drive members comprises actuating a first motor to move a drive assembly to an index mode position, and actuating a second motor to index the drive system transversely relative to the plurality of rotatable drive members.

24. The method according to claim 23 further comprising a rotating drive shaft connected to the second connector, a gear mounted on the drive shaft for rotation therewith, the gear engaging a rack when the drive system is in the index mode position.

25. The method according to claim 22 wherein the step of moving the drive system comprises actuating a first motor to move a drive assembly to a drive position and wherein the step of actuating the drive system comprises actuating a second motor to rotate a drive shaft that is connected to the second connector.

26. The method according to claim 22 wherein the step of actuating the drive system comprises rotating a lead screw to move a drive nut along the lead screw wherein the drive nut is operatively connected to the phase shifter.

* * * * *